United States Patent
Quinn et al.

(10) Patent No.: US 12,229,047 B2
(45) Date of Patent: Feb. 18, 2025

(54) MEMORY ACCESS CONTROL IN A VIRTUALIZATION ENVIRONMENT

(71) Applicant: Assured Information Security, Inc., Rome, NY (US)

(72) Inventors: Rian Quinn, Highlands Ranch, CO (US); Connor James Davis, Denver, CO (US)

(73) Assignee: Assured Information Security, Inc., Rome, NY (US)

( * ) Notice: Subject to any disclaimer, the term of this patent is extended or adjusted under 35 U.S.C. 154(b) by 0 days.

(21) Appl. No.: 17/759,048

(22) PCT Filed: Apr. 20, 2021

(86) PCT No.: PCT/US2021/028093
§ 371 (c)(1),
(2) Date: Oct. 27, 2022

(87) PCT Pub. No.: WO2022/225507
PCT Pub. Date: Oct. 27, 2022

(65) Prior Publication Data
US 2023/0376411 A1 Nov. 23, 2023

(51) Int. Cl.
*G06F 12/02* (2006.01)
*G06F 9/455* (2018.01)

(52) U.S. Cl.
CPC ...... *G06F 12/0292* (2013.01); *G06F 9/45558* (2013.01); *G06F 2009/45583* (2013.01); *G06F 2212/152* (2013.01)

(58) Field of Classification Search
CPC .......... G06F 12/0292; G06F 12/1491; G06F 12/1009; G06F 2212/657; G06F 2212/1052; G05F 9/45558
See application file for complete search history.

(56) References Cited

U.S. PATENT DOCUMENTS

| | | | |
|---|---|---|---|
| 2009/0006714 A1* | 1/2009 | Durham | G06F 12/145 711/6 |
| 2013/0117743 A1* | 5/2013 | Neiger | G06F 9/4555 718/1 |
| 2019/0370049 A1 | 12/2019 | Gopalan | |
| 2021/0089339 A1 | 3/2021 | Tsirkin | |

OTHER PUBLICATIONS

International Search Report and Written Opinion of the International Searching Authority for International Application No. PCT/US2021/028093 mailed on Jul. 14, 2021 (16 pages).
"Analysis and mitigation of L1 Terminal Fault (L1TF)", Security Research & Defense, Aug. 14, 2018, https://msrc-blog.microsoft.com/2018/08/14/analysis-and-mitigation-of-l1-terminal-fault-l1tf/ (12 pages).

* cited by examiner

*Primary Examiner* — Hosain T Alam
*Assistant Examiner* — Nicholas A. Paperno
(74) *Attorney, Agent, or Firm* — Matthew M. Hulihan; Heslin Rothenberg Farley & Mesiti P.C.

(57) ABSTRACT

Memory access control in a virtualization environment is provided. Sets of page tables are maintained, with each set corresponding to a given hypervisor application and guest virtual machine (VM), and each set including mappings to a subset of the guest VM memory to thereby limit an amount of the quest VM memory that is accessible Presentation of these sets is controlled to present just one of the sets at any given time for hypervisor processing to access guest VM memory.

24 Claims, 11 Drawing Sheets

MEMORY ACCESS CONTROL IN A VIRTUALIZATION ENVIRONMENT

BACKGROUND

Memory management and access in a computer system can be complex, particularly when the computer system implements virtualization. The hypervisor is expected to properly isolate the memory spaces dedicated to various guests that it hosts to thereby prevent unauthorized access to memory of one guest by another guest. However, this isolation can be broken in practice depending on the particularities of the architecture and software involved.

SUMMARY

Shortcomings of the prior art are overcome and additional advantages are provided through the provision of a computer-implemented method. The method includes maintaining a plurality of sets of page tables for a computer system executing a microkernel hypervisor with host privileges. The microkernel hypervisor hosts a plurality of guest virtual machines (VMs) executing with guest privileges, each guest VM of the plurality of guest VMs having guest VM memory corresponding to a dedicated portion of computer system physical memory for guest VM execution. The plurality of sets of page tables comprise, for each guest VM of the plurality of guest VMs and each hypervisor application of the plurality of hypervisor applications, a respective set of page tables corresponding to the combination of that guest VM and that hypervisor application, where, for any guest VM of the plurality of guest VMs and any hypervisor application of the plurality of hypervisor applications, there is a corresponding set of page tables of the plurality of sets of page tables that maps guest virtual memory to computer system physical memory and the corresponding set of page tables includes mappings to at most a subset of the guest VM memory to thereby limit an amount of the guest VM memory that is accessible when the corresponding set of page tables is presented for executing software. The method also controls presentation of the plurality of sets of page tables for hypervisor processing. The controlling presentation selectively presents just one of the sets of page tables at any given time during hypervisor application execution to provide access to guest VM memory. Access to guest VM memory and the corresponding portion of the computer system physical memory is controlled by controlling a page table base address presented in hardware of the computer system. The controlling presentation includes, based on a request for hypervisor processing for a guest VM of the plurality of guest VMs: identifying a hypervisor application of the plurality of hypervisor applications to service the request for hypervisor processing; identifying the set of page tables, of the plurality of sets of page tables, that corresponds to the combination of the identified hypervisor application and the guest VM for which the hypervisor processing was requested; and presenting the identified set of page tables for guest VM memory access by the identified hypervisor application and the microkernel hypervisor by indicating a page table address of the identified set of page tables as the page table base address in hardware for the hypervisor application and the microkernel hypervisor to use in accessing guest VM memory. Presenting the identified set of page tables limits the amount of guest VM memory, of that guest VM, that is accessible by that hypervisor application and the microkernel hypervisor to at most the subset of the guest VM memory.

Further, a computer system is provided that includes memory; and a processor in communication with the memory. The computer system is configured to perform a method that includes maintaining a plurality of sets of page tables for a computer system executing a microkernel hypervisor with host privileges. The microkernel hypervisor hosts a plurality of guest virtual machines (VMs) executing with guest privileges, each guest VM of the plurality of guest VMs having guest VM memory corresponding to a dedicated portion of computer system physical memory for guest VM execution. The plurality of sets of page tables comprise, for each guest VM of the plurality of guest VMs and each hypervisor application of the plurality of hypervisor applications, a respective set of page tables corresponding to the combination of that guest VM and that hypervisor application, where, for any guest VM of the plurality of guest VMs and any hypervisor application of the plurality of hypervisor applications, there is a corresponding set of page tables of the plurality of sets of page tables that maps guest virtual memory to computer system physical memory and the corresponding set of page tables includes mappings to at most a subset of the guest VM memory to thereby limit an amount of the guest VM memory that is accessible when the corresponding set of page tables is presented for executing software. The method also controls presentation of the plurality of sets of page tables for hypervisor processing. The controlling presentation selectively presents just one of the sets of page tables at any given time during hypervisor application execution to provide access to guest VM memory. Access to guest VM memory and the corresponding portion of the computer system physical memory is controlled by controlling a page table base address presented in hardware of the computer system. The controlling presentation includes, based on a request for hypervisor processing for a guest VM of the plurality of guest VMs: identifying a hypervisor application of the plurality of hypervisor applications to service the request for hypervisor processing; identifying the set of page tables, of the plurality of sets of page tables, that corresponds to the combination of the identified hypervisor application and the guest VM for which the hypervisor processing was requested; and presenting the identified set of page tables for guest VM memory access by the identified hypervisor application and the microkernel hypervisor by indicating a page table address of the identified set of page tables as the page table base address in hardware for the hypervisor application and the microkernel hypervisor to use in accessing guest VM memory. Presenting the identified set of page tables limits the amount of guest VM memory, of that guest VM, that is accessible by that hypervisor application and the microkernel hypervisor to at most the subset of the guest VM memory.

Yet further, a computer program product is provided that includes a computer readable storage medium storing instructions for execution to perform a method. The method includes maintaining a plurality of sets of page tables for a computer system executing a microkernel hypervisor with host privileges. The microkernel hypervisor hosts a plurality of guest virtual machines (VMs) executing with guest privileges, each guest VM of the plurality of guest VMs having guest VM memory corresponding to a dedicated portion of computer system physical memory for guest VM execution. The plurality of sets of page tables comprise, for each guest VM of the plurality of guest VMs and each hypervisor application of the plurality of hypervisor applications, a respective set of page tables corresponding to the combination of that guest VM and that hypervisor application, where, for any guest VM of the plurality of guest VMs and any hypervisor application of the plurality of hypervisor applications, there is a corresponding set of page tables of the plurality of sets of page tables that maps guest virtual memory to computer system physical memory and the corresponding set of page tables includes mappings to at most a subset of the guest VM memory to thereby limit an amount of the guest VM memory that is accessible when the corresponding set of page tables is presented for executing software. The method also controls presentation of the plurality of sets of page tables for hypervisor processing. The controlling presentation selectively presents just one of the sets of page tables at any given time during hypervisor application execution to provide access to guest VM memory. Access to guest VM memory and the corresponding portion of the computer system physical memory is controlled by controlling a page table base address presented in hardware of the computer system. The controlling presentation includes, based on a request for hypervisor processing for a guest VM of the plurality of guest VMs: identifying a hypervisor application of the plurality of hypervisor applications to service the request for hypervisor processing; identifying the set of page tables, of the plurality of sets of page tables, that corresponds to the combination of the identified hypervisor application and the guest VM for which the hypervisor processing was requested; and presenting the identified set of page tables for guest VM memory access by the identified hypervisor application and the microkernel hypervisor by indicating a page table address of the identified set of page tables as the page table base address in hardware for the hypervisor application and the microkernel hypervisor to use in accessing guest VM memory. Presenting the identified set of page tables limits the amount of guest VM memory, of that guest VM, that is accessible by that hypervisor application and the microkernel hypervisor to at most the subset of the guest VM memory.

In one or more embodiments the guest VM memory comprises a collection of direct-mapped physical memory pages for guest VM execution, and the subset of the guest VM memory made accessible by the hypervisor application and the microkernel hypervisor to use comprises at most a subset of the collection of direct-mapped physical memory pages for guest VM execution.

In one or more embodiments, the identified set of page tables for guest VM memory accessible by the identified hypervisor application and the microkernel hypervisor to use present only a minimum amount of guest VM memory to support execution of the hypervisor application in performing its functions in servicing the request for hypervisor processing.

In one or more embodiments, each request for hypervisor processing by any of the plurality of guest VMs is serviced by a selected hypervisor application of one or more hypervisor applications of the plurality of hypervisor applications.

In a first case, the request for processing comprises a trap to hypervisor processing which immediately invokes processing of the microkernel hypervisor for a determination of which hypervisor application is to service the request for hypervisor processing, and the method further comprises: executing the microkernel hypervisor and determining, by the microkernel hypervisor, whether the request for hypervisor processing comprises a request by the guest VM for a paravirtualization interface or a request by the guest VM for emulation of a guest instruction; selecting, as the identified hypervisor application to service the request for hypervisor processing, between a first hypervisor application of the one or more hypervisor applications and a second hypervisor application of the one or more hypervisor applications, the first hypervisor application being dedicated to servicing paravirtualization interface requests, and the second hypervisor application being dedicated to servicing guest VM instruction emulation requests, where the identifying the set of page tables and the presenting the identified set of page tables for guest VM memory access identifies and presents the set of page tables corresponding to the guest VM and the selected first or second hypervisor application for execution of the selected first or second hypervisor application, which limits the amount of the guest VM memory that is accessible by that first or second hypervisor application and the microkernel hypervisor to at most a first subset of the guest VM memory; executing the selected first or second hypervisor application to begin servicing the request for hypervisor processing, where the executing the selected first or second hypervisor application comprises invoking, by the executing selected first or second hypervisor application, execution of another hypervisor application, of the plurality of hypervisor applications, for further hypervisor processing to service the request for hypervisor processing, where the invoking is performed by a call to the microkernel hypervisor by the selected first or second hypervisor application; based on invoking execution of the another hypervisor application, identifying another set of page tables of the plurality of page tables, which corresponds to the guest VM and the another hypervisor application, and switching the page table base address in hardware to be the page table address for the another identified set of page tables, to thereby present the another set of page tables for the another hypervisor application and the microkernel hypervisor to use in accessing guest VM memory during execution of the another hypervisor application, where presenting the another set of page tables limits the amount of guest VM memory that is accessible by the another hypervisor application and the microkernel hypervisor to at most a second subset of the guest VM memory, the second subset being a different portion of guest VM memory than the first subset; and based on completing execution of the another hypervisor application to complete handling of the request for hypervisor processing, either (i) initiating a return of context to the selected first or second hypervisor application, which includes switching the page table base address in hardware to the page table address for the identified set of page tables for the selected first or second hypervisor application, or (ii) initiating a world switch back to the guest VM, which includes switching the page table base address in hardware to a page table address for a set of page tables for execution of the guest VM.

In a second case, the request for processing comprises a trap to hypervisor processing which invokes execution of the identified hypervisor application to begin servicing the request for hypervisor processing and indicates the page table address of the identified set of page tables as the page table base address in hardware for the hypervisor application and the microkernel hypervisor to use in accessing guest VM memory, thereby limiting the amount of guest VM memory that is accessible by the identified hypervisor application and the microkernel hypervisor to at most the subset of the guest VM memory, where the subset is a first subset of the guest VM memory, and where the method further comprises: the identified hypervisor application, as part of its execution, invoking execution of another hypervisor application, of the plurality of hypervisor applications, for further hypervisor processing to service the request for hypervisor processing, where the invoking is performed by a call to the microkernel hypervisor by the identified hypervisor application; based on invoking execution of the another hypervisor application, identifying another set of page tables of the plurality of page tables, which corresponds to the guest VM and the another hypervisor application, and switching the page table base address in hardware to the page table address for the another identified set of page tables, to thereby present the another set of page tables for the another hypervisor application and the microkernel hypervisor to use in accessing guest VM memory during execution of the another hypervisor application, where presenting the another set of page tables limits the amount of guest VM memory that is accessible by the another hypervisor application and the microkernel hypervisor to at most a second subset of the guest VM memory, the second subset being a different portion of guest VM memory than the first subset; and based on completing execution of the another hypervisor application to complete handling of the request for hypervisor processing, either (i) initiating a return of context to the hypervisor application, which includes switching the page table base address in hardware to the page table address for the identified set of page tables for the identified hypervisor application, or (ii) initiating a world switch back to the guest VM, which includes switching the page table base address in hardware to be a page table address for a set of page tables for execution of the guest VM.

In one or more embodiments, one hypervisor application of the plurality of hypervisor applications is invoked for execution only in response to invocation by a different hypervisor application of the plurality of hypervisor applications.

In one or more embodiments, the page table base address is provided in hardware in a page table address register, and the indicating the page table address of the identified set of page tables comprises storing the page table address of the identified set of page tables in the page table address register.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are approaches for controlling availability and accessibility of memory spaces by executing software, particularly in computer environments implementing virtualization.

Figure 1:
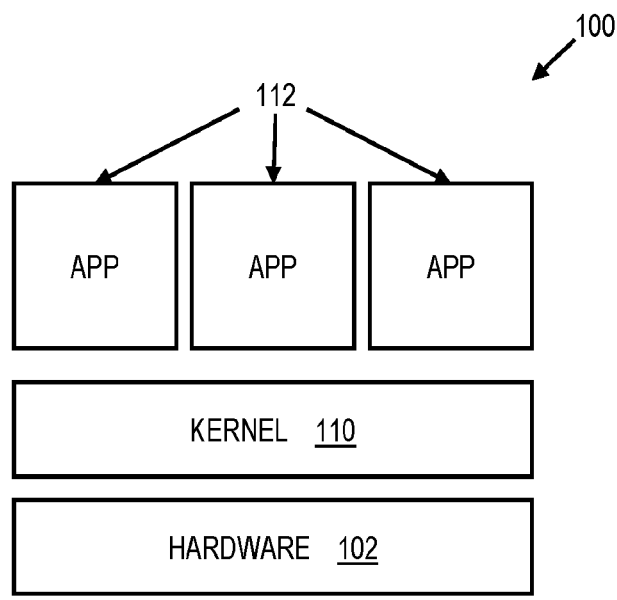
FIG. 1 depicts an example of a computer system executing software.

FIG. 1 depicts an example of a computer system executing software. Computer system 100 includes a set of physical hardware 102, which includes processor(s) and physical memory among other components. Executing on/above physical hardware 102 is kernel software 110. A kernel typically executes as part of an operating system (OS). A kernel performs various tasks including the coordination of communication and other interactions between software applications (such as 112 in FIG. 1) that execute above the kernel and the physical hardware of the system. Applications 112 can include both those with which a user interacts and those with which the user has limited or no interaction, which may include software that was installed intentionally or unintentionally by the user. Though not depicted, other software in addition to the kernel and applications 112 can also execute on the system.

It is common to control the privileges given to various software executing on a system. Privileges in this sense encompasses execution privileges that dictate the types of instructions and activity that the software is permitted to perform/execute. This directly relates to what access the software has to physical hardware resources and data of the system. The kernel 110 and other important software is usually afforded heightened execution privileges relative to the privileges of other software, such as some user applications 112. Software executing with heightened permissions is sometimes said to be a 'kernel mode' or 'kernel space' application executing in kernel space/kernel mode. Software executing with limited privileges is sometimes said to be a 'user space' or 'user mode' application executing in user space/user mode/userland. This is despite the fact that some 'user applications' (i.e. with which the user interacts) may actually execute at the kernel privilege level, e.g. alongside or as part of the kernel/OS.

The privilege paradigm is sometimes referred to in terms of protection rings, where a lower ring number identifies a more privileged mode of execution. Software executing with the most privileges—the kernel for instance—is said to be executing in Ring 0, while userland software is said to execute in Ring 3.

Figure 2:
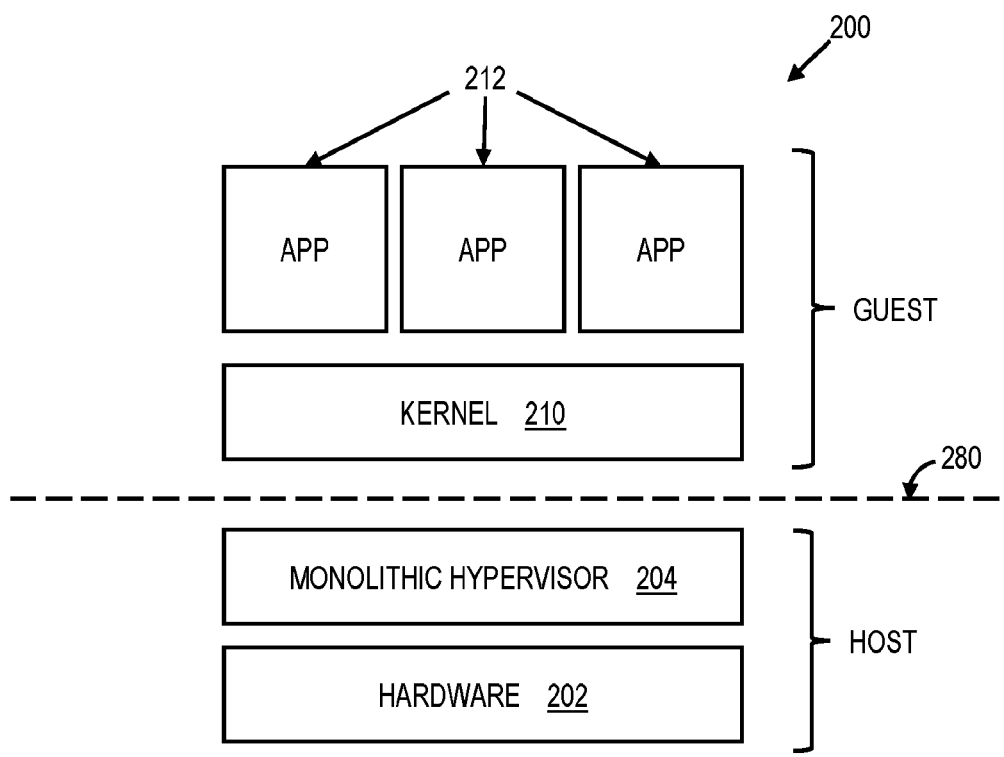
FIG. 2 depicts an example of a computer system that implements virtualization in the execution of software.

FIG. 2 depicts an example of a computer system that implements virtualization in the execution of software. In a common virtualization approach, a hypervisor 204 of the computer system 200 executes above physical hardware 202 and coordinates execution of guest software, including communication and interaction between the guest software and the physical hardware of the system. In the example of FIG.

2, the guest software includes a kernel 210 and the applications 212 executing above the kernel 210.

The hypervisor 204 is said to be the 'host' for guest software 210, 212. A key function performed by the hypervisor is the emulation of physical hardware devices for use by the guest software. Line 280 indicates the conceptual division between the host software (below the line) and the guest software (above the line). Privileges can also be controlled in this virtualization approach such that host software (hypervisor 204) executes in a more privileged mode with host privileges than does the guest software. Generally, permissions/privileges for any host software is more extensive than for guest software, meaning that the host software can invoke/perform more privileged operations than can the guest software. Often, guest software will call to or otherwise cause an automatic exit/trap to host software to prompt some host (hypervisor) processing.

At the guest level, the privileges afforded to kernel 210 may be heightened relative to those afforded to the applications 212, analogous to the situation described above with respect to FIG. 1. In the protection ring parlance, kernel 210 executes in Ring 0, applications 212 execute in Ring 3, and the hypervisor 204 executes in a 'hypervisor' or 'privileged' mode, Ring −1, that controls access to hardware by ring 0 software.

In a widely used application of the above, the kernel 210 is part of an OS that executes applications 212 installed therewith, and the collection of the kernel/OS 210 and applications 212 constitutes a single guest virtual machine (VM) hosted by the hypervisor 204. A guest virtual machine is sometimes referred to as just "guest" or "virtual machine". The hypervisor 204 can host any number (0 or more) of guest VMs, controlling the execution of each guest VM on the physical hardware and each guest VM's access to the various resources of the system 200.

With respect to the host privileges afforded the Ring −1 protection level, those host privileges can themselves be divided between heightened and lessened privileges (e.g. akin to the 'Ring 0' vs. 'Ring 3' designation), similar to the privilege control exhibited at the guest privilege level in FIG. 2. However, most hypervisors (including that of FIG. 2) are designed to be "monolithic", in which all of the software code and hypervisor processing executes in the supervisory/privileged mode ('Ring 0') at that host Ring −1 privilege level.

Figure 3:
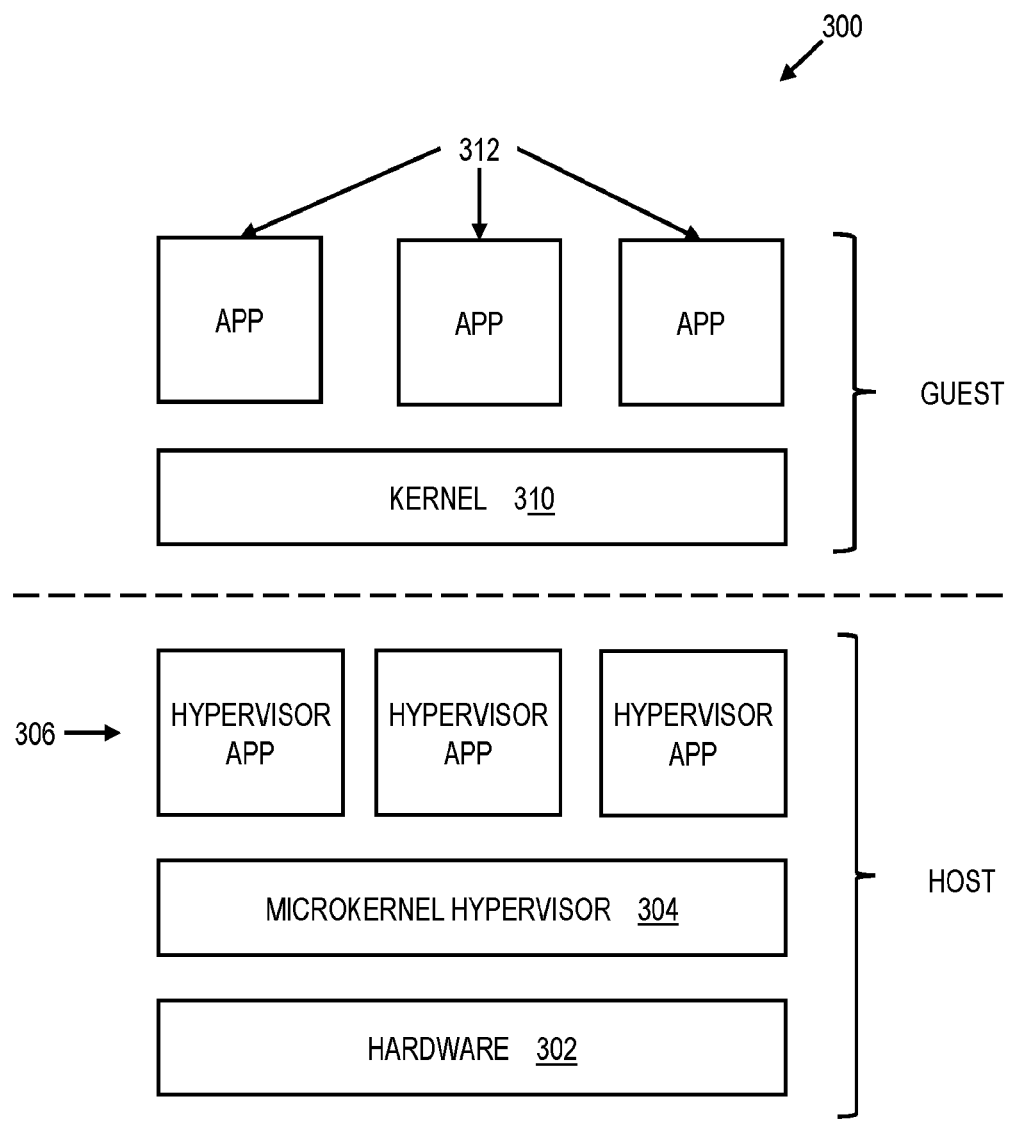
FIG. 3 depicts an example computer system that implements virtualization with controlled permissions at the host privilege level.

The concept of controlled permissions at the host privilege level is illustrated with reference to FIG. 3, depicting an example computer system 300 that implements such virtualization with controlled permissions at the host privilege level. At the host level, the software includes a microkernel hypervisor 304 (sometimes referred to as a "microkernel-based hypervisor") and hypervisor applications 306 above physical hardware 302. Privileges of the host software at Ring −1 are divided as they are at the guest level: the microkernel hypervisor 304 executes with heightened privileges relative to the privileges of the hypervisor applications 306, thereby creating a Ring0/Ring3 structure within the host, Ring −1, protection level. Meanwhile, kernel 310 and applications 312 execute at the guest level. A hypervisor application 306 is generally more privileged than the kernel 310, but those privileges of the hypervisor application 306 are limited relative to those of the microkernel hypervisor 304; there are some instructions that the hypervisor application 306 does not have privilege to execute because it executes with only limited host privileges relative to the microkernel hypervisor 304.

Thus, hypervisor applications 306, while they execute at the host privilege level, may be limited in terms of the types of operations/instructions they are allowed to perform relative to those of the microkernel hypervisor 304. The microkernel hypervisor 304 executes as the most privileged entity depicted in FIG. 3. Since the hypervisor applications 306 execute at the host privilege level, albeit with limited host privileges, there may be operations that they can perform that neither the kernel 310 nor applications 312 can perform.

In the approach of FIG. 3, as compared to the approach of FIG. 2, the hypervisor is conceptually split into a microkernel 304 and hypervisor applications 306. At least some hypervisor processing and activity is executed not in the supervisory/privileged mode at the host level by the microkernel hypervisor but in a less-privileged mode at the host level by hypervisor application(s). In other words, hypervisor processing can be allocated to the microkernel hypervisor 304 and hypervisor applications 306 as desired, and therefore these entities (304, 306) may be collectively referred to as a "hypervisor" or "host".

In some examples, the microkernel hypervisor 304 is part of an OS executing at that level in the host, and the OS could be a consumer operating system that executes some user applications in the less-privileged mode at the host level. As in the example of FIG. 2, software at the guest level in FIG. 3 can execute in discrete guest VM(s). Thus, kernel 310 and applications 312 could be wrapped into a single instantiated guest VM executing above the host.

In this structure, the privilege level of the microkernel hypervisor 304 is such that it has the necessary privileges to perform the functions and activities that all less privileged entities (e.g. 306, 310, 312) could (and more), however it is also noted that this does not necessarily mean that the microkernel hypervisor is actually configured/programmed to perform all such functions and activities. Instead, the microkernel hypervisor could be programmed to perform only a limited set of functions despite it having privileges to perform a much broader collection of functions. To this point, it may be desired to make the microkernel hypervisor—the most privileged software entity depicted in the figure—as tiny as possible from a functional standpoint to thereby limit the functions it can perform. Activity that does require privileged mode privileges ('Ring 0') of the host level to be performed can be placed into the less-privileged ('Ring 3') privilege level of the host. This still provides the desired privileged functionality at the host level to service the guest VMs executing at the guest level (i.e. to handle traps to the hypervisor) but it does so by software with relatively limited permissions. In this example, the microkernel hypervisor 304 could be intentionally configured (programmed, coded) to provide only a limited number of functions—for instance only those that require supervisory privileges at the host privilege level. In some examples, the majority of host permission level processing necessary to service guest VM traps to the hypervisor could be implemented in one or more hypervisor applications 306 executing in the less-privileged mode of the host privilege level.

Figure 4:
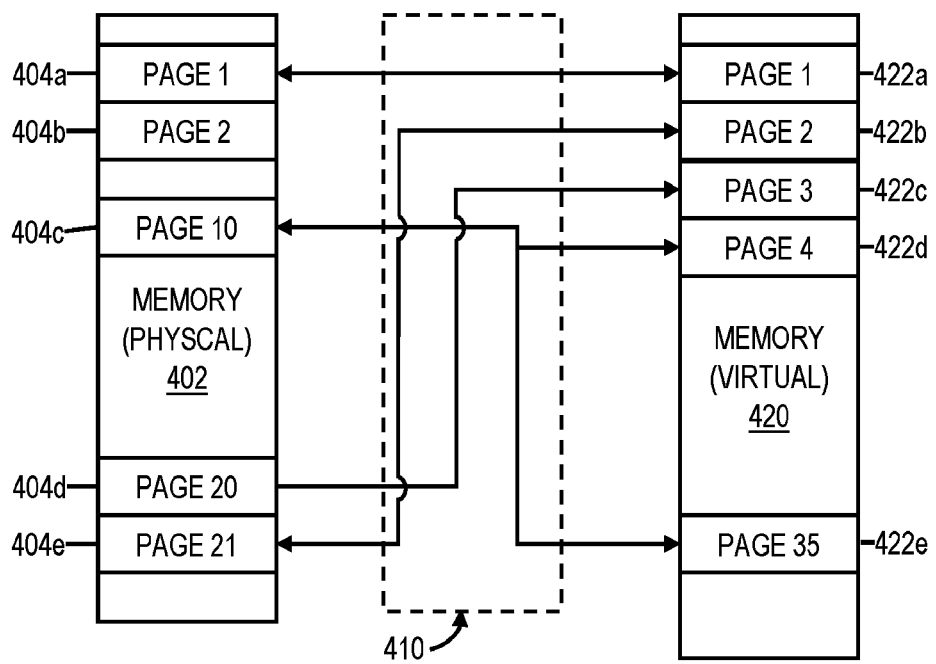
FIG. 4 depicts an example conceptual diagram of page tables mapping between physical memory and virtual memory space.

An important activity performed by software, usually the OS/kernel, in any computer system is memory management. This includes management of page tables that map virtual memory space identified using virtual memory addresses to physical memory space identified using physical memory addresses. FIG. 4 depicts an example conceptual diagram of page tables mapping between physical memory and virtual memory space. The hardware of a computer system includes physical memory 402, commonly referred to as Random Access Memory (RAM), computer system memory, working memory, or volatile memory. Physical memory 402 is contrasted with persistent, non-volatile data storage devices such as hard drives and optical media. It is further contrasted with processor cache memory residing on the processor hardware at various levels (L1, L2, etc.).

The physical memory 402 is logically divided into pages—chunks of continuous physical memory locations, the chunks typically being of a predefined size. In FIG. 4, only five such physical memory pages (404*a*, 404*b*, 404*c*, 404*d*, 404*e*) are shown but it is understood that the physical memory 402 includes many more pages.

To facilitate execution of multiple programs on the computer system, virtual memory space 420 is established. This enables the presentation of consistent and contiguous portions of 'memory' to software. A virtual memory space 420 is also divided into pages (virtual memory pages 422*a*, 422*b*, 422*c*, 422*d*, 422*e*) and is accessed by software using virtual memory addresses. The virtual memory is not actual, physical storage but is instead said to be 'backed' by physical memory pages; each virtual memory page is mapped to a corresponding physical memory page in physical memory, enabling access thereto for data to be stored to and retrieved from the physical memory by way of the virtual page. These mappings between virtual memory pages and physical memory pages are provided as entries in page table data structures 410. The page tables 410 are shown conceptually between the physical memory 402 and virtual memory 420 in FIG. 4 but are commonly stored in physical memory 402. Typically, though not always, there are several page tables rather than just one large page table. One (or more) virtual memory pages of virtual memory space map to a physical memory page, though any given virtual memory page can be mapped to at most one physical memory page at any given time. The phrase "page tables" as used throughout this disclosure and the claims encompasses both a single page table and a plurality of (i.e. two or more) page tables and therefore "page tables" is used both the single and plural sense.

In the example of FIG. 4, the page tables 410 include entries defining mappings shown by lines connecting virtual memory pages to physical memory pages. Here, mappings exist between (i) physical memory page 404*a* and virtual memory page 422*a*, (ii) physical memory page 404*c* and both virtual memory pages 422*c* and 422*d*, (iii) physical memory page 404*d* and virtual memory page 422*c*, and (iv) physical memory page 404*e* and virtual memory page 422*b*. It is noted that no virtual memory page is mapped to physical memory page 404*b* in this example, meaning page 404*b* is effectively inaccessible to whatever software utilizes the virtual memory space defined by these page tables 410 unless/until a mapping from a virtual page to that physical page is defined in these page tables.

Access to the page tables is provided by way of a page table base address, which is an address of physical memory at which the page table data structures are stored. The page table base address is typically a starting address of those page tables, and the access is provided usually by storing the address in an architected central processing unit (CPU) register for access and use by the OS and other software to reference into the page tables in order to access data stored in memory. Access to computer system memory by any currently executing software at any privilege level is thereby controlled in part by controlling the page table base address that is presented in the hardware of the computer system. An OS maintains a set of page tables that contain mappings to memory that holds the operating system code itself and the code for whichever application is running at any given point in time. In a non-virtualized environment, the page tables map the OS's virtual memory to physical memory (hardware). In a virtualized environment, page table access is controlled according to whether a guest VM or the hypervisor is executing, as is explained further herein.

Figure 5:
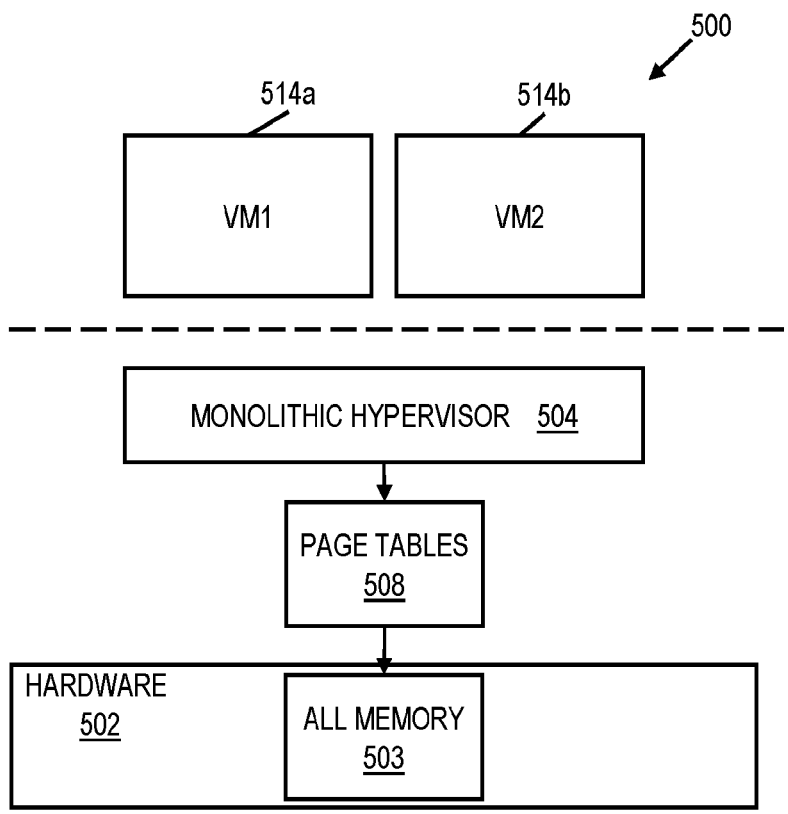
FIG. 5 depicts an example of hypervisor virtual memory space mapping in a computer system that implements virtualization.

FIG. 5 depicts an example of hypervisor virtual memory space mapping in a computer system that implements virtualization. Computer system 500 implements a monolithic hypervisor 504 executing on system hardware 502. The hardware 502 includes physical memory 503. The hypervisor 504 hosts two guest virtual machines in this example—guest VM1 (514*a*) and guest VM2 (514*b*) as guests of the (host) hypervisor.

The page tables made available by hardware at any moment in time depends in part on the software that the hardware is executing at that moment in time. When host/hypervisor software is executing on the hardware, i.e. as opposed to when guest software is executing on the hardware, a set of page tables 508 with mappings to all of the pages in physical memory 503 that back the virtual memory space for the hypervisor is made available to the hypervisor for hypervisor execution. That set of page tables is made available in hardware by placing the address for the page tables (a base address) into an architected register, e.g. the page table base register (PTBR) or CR3 register. The mappings include mappings to memory for the hypervisor as well as its hosted guest VMs, effectively enabling the hypervisor 504 to access and 'see' the memory for the entirety of its hosted guest VMs as well as itself.

A role of the hypervisor 504 may be to provide each guest VM with memory (guest VM memory) for the guest VM's execution and use. Guest VM memory encompasses addressable virtual memory space, which is backed by a portion of the physical memory of the system. At least some of the guest VM memory and corresponding backing physical memory may be dedicated to that guest VM for its execution, meaning that portion of guest VM memory is not used for or accessible to any of the other guest VMs. Other guest VM memory may be 'shared'—that is, shared between the guest VM and one or more other guest VMs of the system, in which case the virtual memory spaces provided to the guest VM and the one or more other guest VMs each contain some mappings to the shared memory, typically a set of shared memory page(s).

When a mapping between a physical page and a virtual page is direct, meaning that the physical memory page can be accessed directly by using the address of the virtual memory page plus some known positive or negative offset, it is referred to as a "direct map". Direct mapping allows software to bypass a lookup in the page tables by instead directly referencing into the backing physical memory page using the virtual memory page address and the offset. This can be very useful for speed and efficiency since the process of walking the page tables to identify a physical memory page address can be a very expensive operation. Many hypervisors and OSs therefore implement direct mapping by taking much of physical memory and direct-mapping it to a beginning portion of the virtual memory space for the OS/hypervisor. The OS/hypervisor in these instances often consumes about half of the entire virtual memory space by mapping it to the pages in physical memory and uses remaining virtual memory space for execution of itself and its applications. Virtual memory is therefore generally larger in size than the physical memory of the system, resulting in multiple virtual memory page mappings to the same physical memory page.

In a direct-map situation, most of the physical memory sits (virtually) inside of the virtual memory space for the OS/hypervisor. As a result, when a particular piece of userland software is executing, the page tables that define that software might contain mappings for not only memory holding itself but also for memory holding the entire kernel and all other applications. This presents a security concern: secrets and sensitive data such as decryption keys, passwords, etc. that might exist in physical memory could reside inside of the virtual memory space since the virtual memory space has access to those backing physical memory pages. While the central processing unit (CPU) has a privilege check to theoretically prevent any application from accessing pages that the application is not supposed to access, an attack that gains access to virtual memory space via those mappings provides access to the backing physical memory pages in which all of the sensitive data sits. A particular, known attack exploits a common practice of pulling into a CPU cache the pages of memory holding all of the page table mappings based on a memory access request, before the CPU then denies the access request if the requesting software is not allowed to touch the requested memory. Because the mappings nonetheless sit in the CPU cache for some amount of time, they are a target for a side channel attack that gains access to that CPU cache memory.

In a hypervisor scenario, conventionally the hypervisor's virtual memory space maps-in, at all times, at least the contents of all hosted guest VMs of that hypervisor together with any memory the hypervisor uses for its processing. If software executing in one guest VM can find an exploit, such as the CPU cache exploit mentioned previously, to read data from the virtual memory space of the hypervisor, then the software has access to everything in the hypervisor's virtual memory. This is particularly troubling in a direct map situation where the hypervisor's virtual memory space maps-in most of the system's physical memory.

Figure 6:
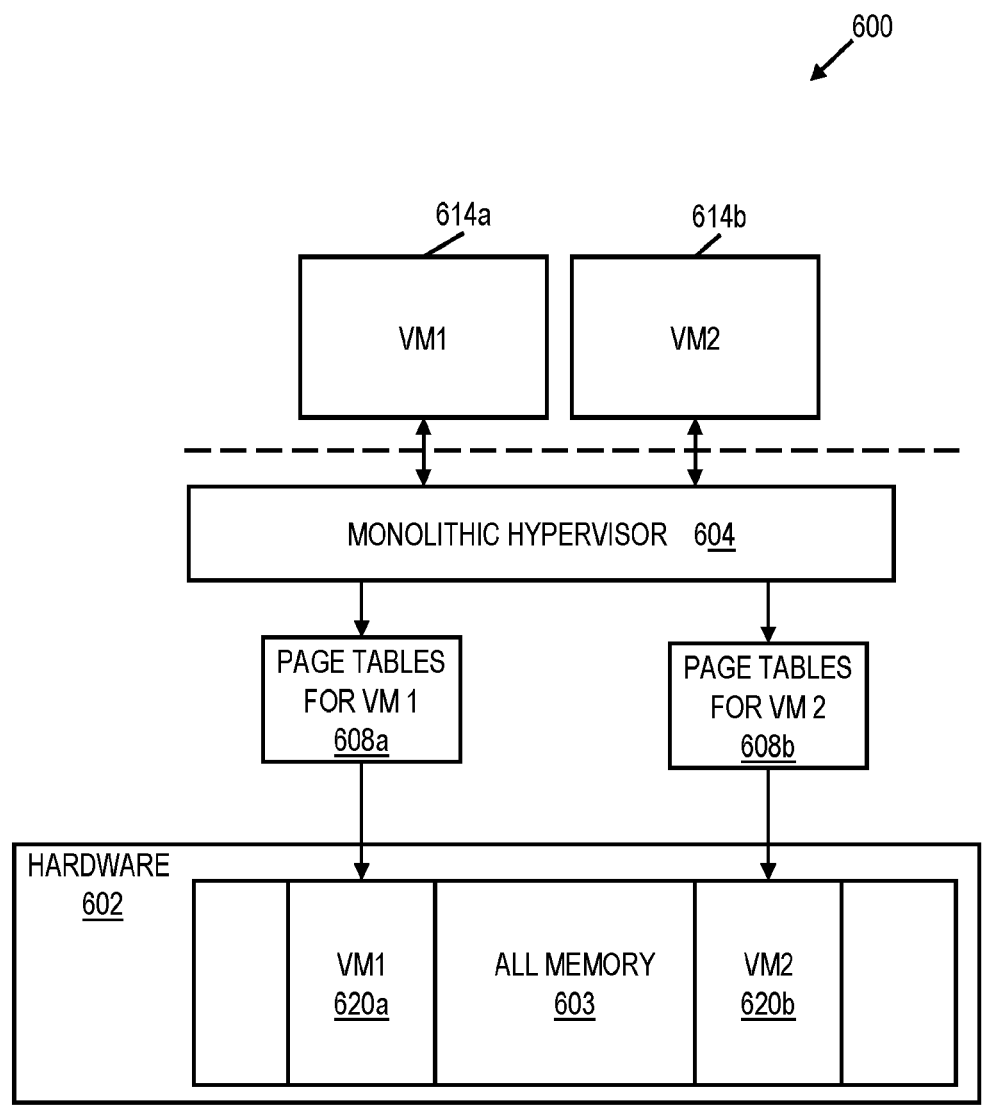
FIG. 6 depicts another example of hypervisor virtual memory space mapping in a computer system that implements virtualization.

One approach to help prevent access by execution of one guest VM to memory of another guest VM is to load a different set of page tables for hypervisor processing depending on the particular guest VM for which hypervisor processing is called. In this case, the page tables for hypervisor processing called for a first guest VM would map-in the guest VM memory for that first VM but not guest VM memory for the other guest VM(s). This is depicted with reference to FIG. 6, showing another example of hypervisor virtual memory space mapping in a computer system that implements virtualization. As in the example of FIG. 5, computer system 600 implements a monolithic hypervisor 604 hosting guest VMs 614a, 614b and executes on system hardware 602 that includes physical memory 603. In this example, a different set of page tables is maintained for hypervisor processing per guest VM. The set of page tables 608a contains the mappings of virtual memory pages to the physical memory pages indicated by 620a, which are those used for hypervisor processing in connection with the execution of guest VM 614a, for instance the hypervisor processing to handle traps by guest VM 614a. This virtual memory includes the guest VM memory of guest VM 614a. In contrast, the set of page tables 608b contains the mappings of virtual memory pages to the physical memory pages indicated by 620b, which are those used for hypervisor processing in connection with the execution of guest VM 614b, i.e. the hypervisor processing to handle traps by guest VM 614b. Page tables 608b map-in guest VM memory of guest VM 614b. Thus, each set of page tables 608a, 608b maps only a subset of the physical memory pages, and particularly those physical memory pages used for hypervisor processing invoked from a particular guest VM. The sets of physical memory pages 620a, 620b are shown as contiguous memory portions in the figure, but this is for illustration only. Practically speaking, the physical memory pages included in a given set 620a, 620b could be, and very often are, non-contiguous pages.

In this approach, on a trap to hypervisor processing the hypervisor 604 is presented (by way of the PTBR) a set of page tables 608a if the trap was from execution of guest VM1 614a. The hypervisor therefore has access only to portion 620a of the physical memory and thus is unable to access any physical memory pages that are not mapped by the set of page tables 608a. As noted above, access to computer system memory is controlled by controlling a page table base address presented in hardware of the computer system, and so which page tables are presented to the hypervisor at any given time for hypervisor processing to access the computer system memory can be controlled by placing into the architected register the base address of the page tables to make them accessible to the hypervisor. When execution context changes and/or a world switch occurs, so too can the address held in that register.

The approach of FIG. 6 therefore provides the hypervisor access to only the portions of physical memory for hypervisor processing associated with guest VM1 or guest VM2. This improves on the security posture of the computer system relative to FIG. 5 because any exploit in one guest VM to read the virtual memory space of the hypervisor would be able to see and access only whatever memory is mapped in for hypervisor processing for that guest VM. If direct mapping is employed in this situation, the set of page tables presented to the hypervisor would direct-map only those physical memory pages that are used in connection with that guest VM.

The approach of FIG. 6 is an improvement but the memory mapped in for hypervisor processing for an entire guest VM is still a relatively significant amount of memory. Meanwhile, it does not offer protection for guest VM memory that is shared between guest VMs, as the shared memory would be mapped in by the respective set of page tables 608a, 608b for each guest VM. An exploit in one guest VM would be able to access the shared memory pages and therefore potentially some data of another other guest VM. In addition, a malicious userspace application executing in a guest VM could find an exploit of the hypervisor that allows the exploit to leverage the hypervisor's access to memory for the other applications executing in the guest VM. The malicious application could therefore read the memory used for those other applications on account that the memory would be mapped-in by the set of page tables for the hypervisor when handling hypervisor processing for that guest VM. Since many OS/hypervisors leverage the direct-map approach, the virtual memory space mapped in for a single guest VM may likely include all of the physical memory used in executing that VM, meaning the exploit could leverage the hypervisor's direct map to access memory from other userspace apps within that VM.

Figure 7:
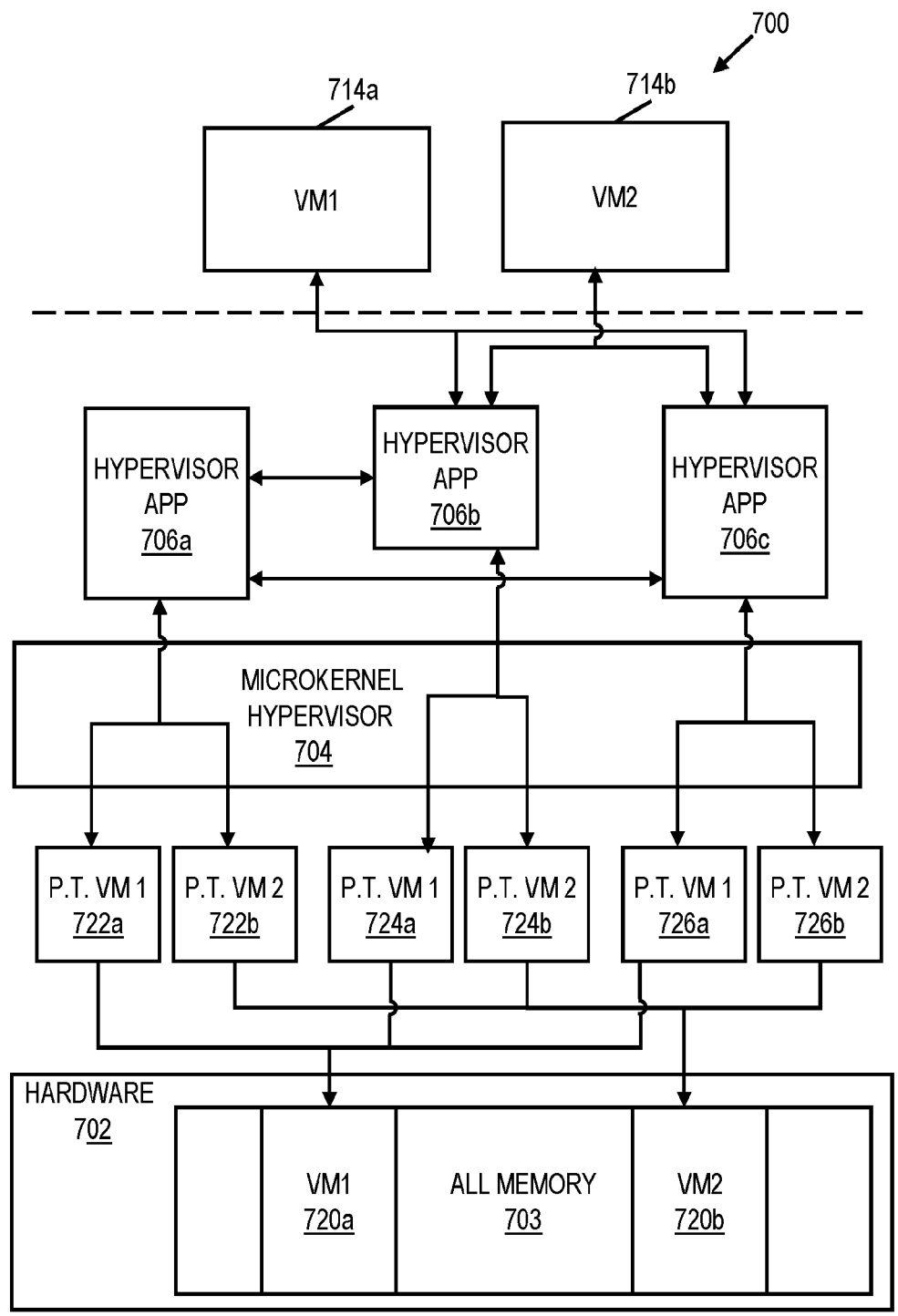
FIG. 7 depicts an example of hypervisor virtual memory space mapping in a computer system that implements virtualization with controlled permissions at the host privilege level, in accordance with aspects described herein.

In accordance with additional aspects described herein, provided is an effective approach for preventing any software in a guest VM from accessing the guest VM memory, even via a hypervisor exploit and even in a direct-map situation. An example illustrative embodiment is provided in FIG. 7, depicting an example of hypervisor virtual memory space mapping in a computer system that implements virtualization with controlled permissions at the host privilege level. In one aspect, computer system 700 is implemented using a microkernel hypervisor architecture. Hypervisor processing is implemented in part using different hypervisor applications 706a, 706b, 706c that execute with limited privileges relative to the microkernel hypervisor 704. Microkernel hypervisor 704 and hypervisor applications 706a, 706b, 706c execute at the host level for hosting zero or more guest VMs, in this example guest VMs 714a and 714b in FIG. 7.

Each hypervisor application 706a, 706b, 706c is software having function(s) defined by the program code of that application. Any hypervisor application can be configured to interact with the microkernel hypervisor as necessary to perform the functions for which it is responsible. The code base for any hypervisor application can be intentionally limited to facilitating only those functions it is dedicated to provide, and some or all such functions could be unique to that hypervisor application, meaning neither any other hypervisor application nor the microkernel hypervisor itself is coded to performs those particular functions. By compartmentalizing the functions that the different hypervisor applications provide for hypervisor processing, this enables separation in terms of which subset of guest VM memory is needed at any given time when the hypervisor, specifically a hypervisor application, is to execute. This enables limiting the amount of guest VM memory, including any guest VM memory that may be direct-mapped, that is available to the hypervisor and hypervisor applications, and reduces the size of a guest VM's direct map that is made available to host processing and reduces the attack surface. This does not mean that the hypervisor application performs only one or two functions per se—it could perform many functions and be a large application—but whatever access it is given to guest VM memory can be limited to just what is needs to perform its functions. In some particular embodiments, a goal is to ensure that any hypervisor application that can communicate directly with a guest VM has the smallest possible direct map, and that any hypervisor application that needs relatively 'a lot' of direct map memory cannot directly communicate with any guest VMs.

As an example, hypervisor application 706b might be responsible for emulation activity that services guest VM instruction emulation requests. A guest's request for hypervisor processing can include invocation of a guest instruction that requires emulation to execute on the physical hardware. The guest's attempted execution of an instruction requiring emulation raises a trap to the hypervisor to perform the emulation. This emulation trap is directed to hypervisor app 706b for further handling in this example. As another example, hypervisor application 706c might be responsible for a paravirtualization or 'enlightenment' interface used by the guest VMs, in which application 706c services paravirtualization interface requests/traps by the guest VMs. A trap to the hypervisor for the paravirtualization interface could be directed to hypervisor app 706c for further handling.

Arrows connecting each guest VM 714a, 714b to each hypervisor app 706a, 706b indicate that traps in guest VM execution to the hypervisor can be directed to application 706b or 706c. The traps could be directed to the hypervisor applications 706b, 706bc either directly or via the microkernel hypervisor 704 if it is to initially handle the trap and direct it to the appropriate application 706b, 706c. Further hypervisor processing can then be performed by the called hypervisor application 706b, 706c, possibly in conjunction with processing of additional hypervisor application(s) as is explained further below.

In another aspect, a hypervisor application such as 706a in FIG. 7 can be one invoked for execution only in response to invocation by one of the other hypervisor applications (e.g. 706b, 706c), as opposed to being invoked directly from a trap to the hypervisor or by the microkernel directing a trap to that hypervisor application. In this manner, hypervisor applications 706b, 706c can invoke execution of hypervisor application 706a for further hypervisor processing. Limiting direct communication between a guest VM and an isolated underlying hypervisor application such as 706a enhances security. It enables the interface (including any necessary guest VM memory needing to be presented at the time) between the guest VMs and hypervisor trap processing by way of applications 706b, 706c to be relatively small and with limited functionality of calling into another hypervisor application (706a) to perform any sensitive/privileged operations to handle the trap processing. As examples, all access to guest VM memory that is shared between guest VMs hosted on the system could be forced through hypervisor application 706a, for example. As another example, interprocess communication (IPC) among processes of different guest VMs may be performed exclusively by that hypervisor application 706a.

Thus, in another aspect of the approach of FIG. 7, a different set of page tables is provided for whatever combination of a specific guest VM and a specific hypervisor application is invoked at any given time. Three sets of page table(s) (722a, 724a, 726a)— one for each of the three hypervisor applications depicted—are provided corresponding to guest VM 714a, and three sets of page table(s) (722b, 724b, 726b)—one for each of the three hypervisor applications depicted—are provided corresponding to guest VM 714b. Each set of these page tables includes one or more page tables, and each presents a respective different subset of guest VM memory, having mapping(s) for only a limited subset of physical memory pages, and specifically those pages that are part of the physical memory to support hypervisor processing for (i) a specific guest VM 714a or 714b and (ii) a specific hypervisor application 706a, 706b or 706c. In FIG. 7, hardware 702 includes physical memory 703 with pages 720a corresponding to guest VM 714a and pages 720b corresponding to guest VM 714b. Each set of page tables 722a, 724a, 726a therefore maps to a subset of pages of 720a and each set of page tables 722b, 724b, 726 maps to a subset of pages of 720b.

The guest VM memory made available for hypervisor processing at any given time when a hypervisor application is executing can therefore be dependent on both (i) the guest VM on which the request for hypervisor processing is based, and (ii) the particular hypervisor application being executed.

When the hypervisor is executed to service a request for hypervisor processing for a guest VM, then access to guest VM memory and the corresponding computer system memory can be controlled such that what is made available in terms of guest VM memory to the hypervisor and hypervisor application executing at any given point in time during the hypervisor processing to service that request is only that subset corresponding to that hypervisor application and that guest VM, i.e. one of the sets 722a, 722b, 724a, 724b, 726a, 726b. This is true even if a first hypervisor application (e.g. 706b) calls to a second hypervisor application (e.g. 706a). Upon such a call, the page tables made available can change from (i) those for the combination of that guest VM and the first hypervisor application to (ii) those for the combination of that guest VM and the second hypervisor application, to enable the second hypervisor application to execute. Another switch can occur back to the tables for the first application for purposes of responding to the guest VM with any response to the guest VM's request.

By way of specific example, assume that hypervisor application 706b is provided for servicing emulation activity and that guest VM2 714b executes the CPUID program instruction of the x86 family of instruction set architectures offered by Intel Corporation, Santa Clara, California, USA. The CPUID instruction is to be emulated and therefore a trap to the host occurs. Since hypervisor application 706b is responsible for emulation, it is invoked (perhaps directly or perhaps by the microkernel hypervisor, as discussed below) to emulate that instruction. At that point, and on the basis of the trap being from guest VM2 714b and hypervisor application 706b being invoked to handle it, page table(s) 724b will be presented for hypervisor processing (i.e. processing by application 706b and/or microkernel hypervisor 704) to access the computer system memory that encompasses just a portion of the guest VM memory for that guest VM, and even more specifically just the portion of guest VM memory that is needed for application 706b to perform its functions. Those page tables will thus map in a limited amount of guest VM memory and therefore a limited amount of physical memory pages 720b. In a particular example, the starting address for the page table(s) 724b is stored into the PTBR/CR3 register. From that point, hypervisor application 706b can invoke processing of hypervisor application 706a to actually perform the privileged processing to emulate the CPUID instruction. A context switch to hypervisor application 706a occurs and thus the PTBR/CR3 is updated to point to page tables 722b. Application 706a then executes and performs the emulation. A return to guest VM2 714b execution is then initiated either by application 706a or after a context switch back to hypervisor application 706b, for example. At any point during hypervisor processing the physical page(s) mapped in for hypervisor processing are very likely just a proper subset of the physical pages in the whole set of pages 720b provided for hypervisor processing associated with guest VM 714b. Consequently, an exploit of the hypervisor application 706b (the only one with which a guest VM communicates directly) and/or the microkernel hypervisor 704 in this example would have access only to the physical memory pages mapped by tables 724b, which would include only a subset of guest VM memory, specifically the subset that corresponds to that hypervisor application and that guest VM.

In a situation where a hypervisor application, such as 706a, handles functions that are more sensitive and/or present a greater level of security exposure, including when it requires memory shared between two guest VMs and/or is associated with sensitive data of the microkernel hypervisor, then it is possible that the application 706a has access to (via 722a, 722b) a significantly greater amount of guest VM memory than do the other hypervisor applications (e.g. 706b, 706c) with more limited functions of calling to application 706a. But since application 706a is isolated in that it is invoked for execution only via other hypervisor applications, a significantly different type of attack would be needed that first exploits an interposed hypervisor application (706b, 706c) and then leverages another exploit to access the memory space mapped-in for application 706a via page tables 722a or 722b. Even still, the viewable physical pages would be only those presented to hypervisor application 706a for its execution and what is needed for microkernel hypervisor execution in connection with that application 706a. And even still, the map would include only a limited amount of guest VM memory specific to the guest VM for which the hypervisor processing is being performed at that time.

Control is thereby provided over which hypervisor applications are invoked by guest VM traps to the hypervisor, and further which memory (including guest VM memory) is exposed at any given time. It is limited to what is needed by a specific hypervisor application for processing associated with the specific guest VM. Each hypervisor application can be just lightweight enough to accomplish its functions, limiting the guest VM memory that it needs access to, and keeping data sensitive to individual hypervisor applications to their respective memory. In some examples it may be possible to map in only 3 or fewer pages of physical memory for some hypervisor application processing, speeding up any necessary page table walks, and potentially eliminating the need for any direct mapping at the host level.

By forcing the interaction between guest VMs and the host to a particular initial hypervisor application for any given request and then triggering a horizontal call to another hypervisor application to perform the bulk of the request handling, this enables the selective presentation of limited sets of page tables to minimize the physical memory pages mapped-in. Specifically, it limits the memory (including any guest VM memory needed for access) to just that for the particular guest VM and particular hypervisor application being executed. This addresses both cross-VM attacks and intra-VM attacks that might otherwise exploit the hypervisor to read the entire memory mapped in for that entire guest VM or the entire set of guest VMs.

Additional details are now provided to explain aspects of the present disclosure. On boot of a computer system implementing virtualization, the hypervisor loads and creates the guest VMs to execute on the system. As part of this, the hypervisor creates a control structure for each guest VM. The control structure for a guest VM holds various information associated with execution of that guest VM. The hypervisor also creates a set of page tables to use for the execution of each guest VM. These are referred to in some architectures as the Extended Page Tables, or more generally the 'system memory-to-guest memory' page tables. These page tables create a guest VM memory space, and at least some of that guest VM memory (and therefore the backing physical pages) is dedicated to that guest VM, i.e. for execution of that guest VM. It may be that some guest VM memory (backed by one or more physical pages) is shared between guest VMs, in which case the guest VM memory would include a shared portion that is mapped-in by the page tables for the guest. In the control structure for a guest VM is an entry to hold the address of these page tables for execution of that guest VM. There is also a page table address in that control structure to hold the address of another set of page tables—the host-level page tables that the hypervisor is to use on traps from that guest VM to the hypervisor.

Figure 8:
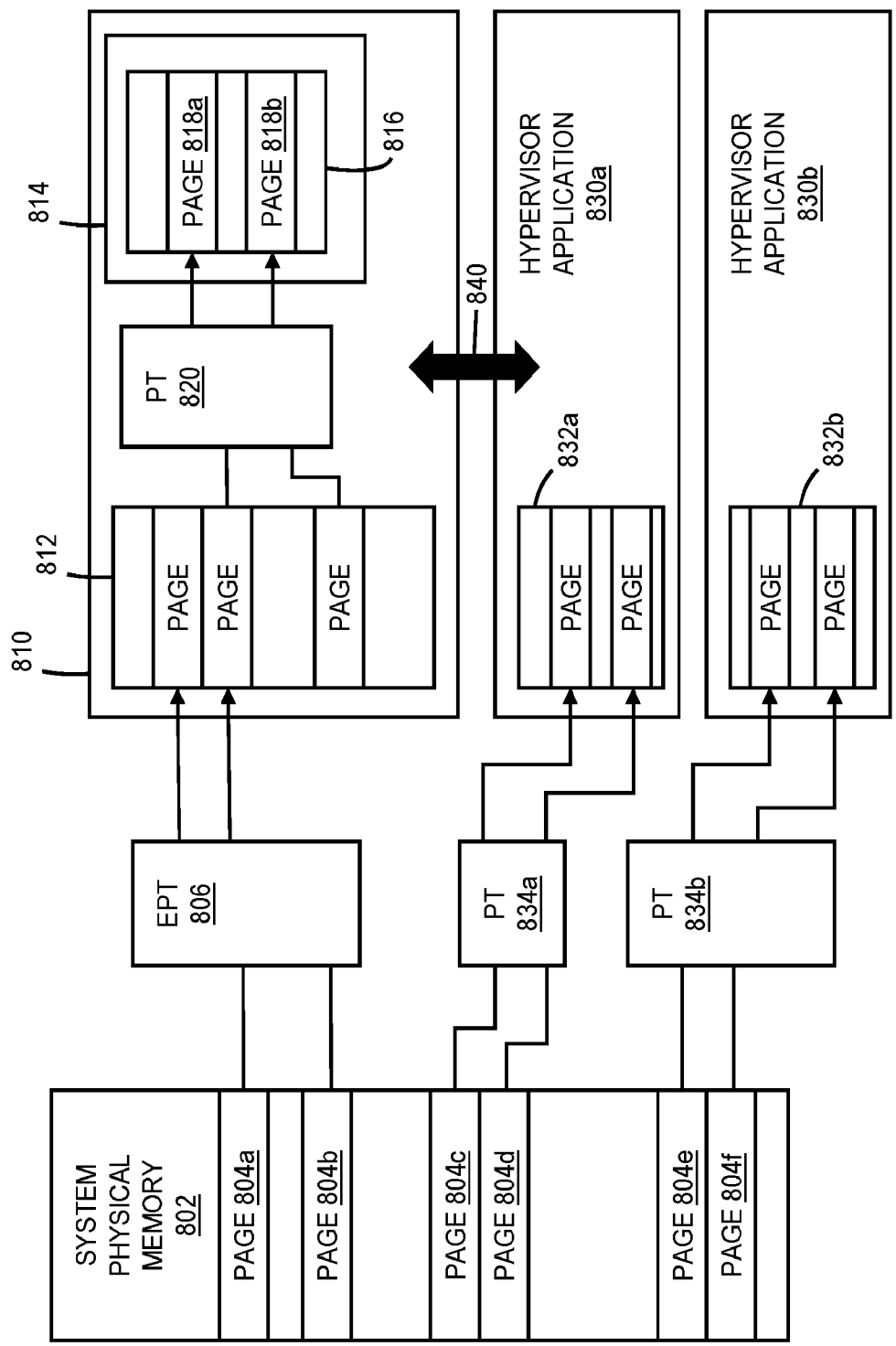
FIG. 8 depicts aspects of memory and page table usage in a virtualized environment, in accordance with aspects described herein.

Aspects of this memory and page table usage in a virtualized environment are depicted and described with reference to FIG. 8. In FIG. 8, a guest VM 810 has its own view of 'system memory'—this view being referred to as guest physical memory 812. or "guest VM memory" herein. This is mapped-in to guest physical memory 812 by way of the extended page tables (EPT) 806 set up by the hypervisor. Here, two pages 804a, 804b in system physical memory 802 of the hardware are mapped-in by EPT 806 for guest VM 810. The EPT 806 is stored in the hypervisor memory space in physical memory.

Within the guest VM 810, an executing userspace application 814 has its own view of 'system memory', i.e. a virtual memory space referred to as 'guest virtual memory' 816. This is provided by page tables 820 in the guest VM, the page tables managed by the guest operating system. An address in guest virtual memory 816 is termed a guest virtual address and an address in guest physical memory 812 is termed a guest physical address. Here, two guest physical memory pages are mapped-in by the page tables 820 to virtual memory pages 818a, 818b.

The guest VM when executing uses the PT 820 to access physical memory (via EPT 806). The hypervisor has knowledge of which guest VM has context at any given time and the hypervisor can control which page tables (EPT) are presented by the PTBR/CR3 for executing software.

On a request for hypervisor processing, e.g. a trap to the hypervisor from guest VM execution, the address of the hypervisor page tables indicated in the control structure of the in-focus VM is loaded into the PTBR/CR3 register for hypervisor handling of the trap. When there is a context switch to another guest VM, this causes a change in which control structure to use and therefore a change in the page tables address to indicate in the PTBR/CR3.

In the context of aspects described herein with reference to FIG. 7, a set of page tables is maintained per hypervisor application, per guest VM. The microkernel hypervisor, when creating a guest VM, creates, for each hypervisor application, a respective set of page table(s) corresponding to that guest VM. Then upon an exit/trap from a guest VM for hypervisor processing, the microkernel hypervisor can place into the PTBR/CR3 the address of the appropriate set of page tables, i.e. the set corresponding to that guest VM and a particular hypervisor application to handle the request.

In FIG. 8, the hypervisor implementation is broken into multiple hypervisor applications 830a, 830b and a microkernel hypervisor (not shown). Hypervisor applications 830a, 830b are Ring 3 applications at the host privilege level with their own view of memory, meaning each hypervisor application has a respective virtual memory space. Virtual memory space 832a for the combination of application 830a and this guest VM 810 is mapped-in by the set of page table(s) 834a that map to physical memory blocks/pages 804c, 804d. Virtual memory space 832b for the combination of this application 830b and this guest VM 810 is mapped-in by the set of page table(s) 834b mapping to physical memory blocks/pages 804e, 804f. It is noted that to the extent a hypervisor application (such as 830a) needs some access to guest VM memory of a guest VM, then the set of page tables (843a) for the combination of that hypervisor application and that guest VM would map-in the appropriate subset of guest VM memory, i.e. an appropriate subset of the physical pages backing the portion of guest VM memory needed by that hypervisor application. As an example, page tables 834a might map-in page 804b, which is one of the physical pages providing a portion of guest VM memory for guest VM 810. Practically speaking, most systems would employ a direct map and therefore if a hypervisor application needed to access the memory of a guest VM, it would use the direct map to perform that access. The direct map is typically a set of page tables in the page tables that are used to execute that hypervisor application.

In addition to memory that the hypervisor application itself occupies and might need for its own execution, and also in addition to any guest VM memory to which the hypervisor application might need access in order to perform its functions for a given guest VM, the hypervisor application might need to communicate with the microkernel hypervisor during execution. Consequently, at least some of the microkernel hypervisor's memory can be mapped-in by the page table(s) (e.g. 834a) for any given hypervisor application. However, in accordance with an embodiment described herein, the page tables for a hypervisor application map-in only the part of the microkernel hypervisor memory that is needed to service that hypervisor application and thus when the hypervisor application needs to leverage the microkernel hypervisor to perform something, there will be no need for a PTBR/CR3 change because the appropriate mappings for microkernel hypervisor memory will be in the page table(s) for that hypervisor application. In an alternative embodiment, there is a dedicated set of page table(s) for microkernel hypervisor execution, separate from the page table(s) for hypervisor application execution. In this case, just enough memory of the microkernel hypervisor could be mapped into the page table(s) for the hypervisor application so that when the hypervisor application calls into the microkernel hypervisor, the then-current mappings (e.g. for the hypervisor application) has enough code mapped-in to swap to the page table base address of the page table(s) for the microkernel hypervisor and execute. In this embodiment, Process Context Identifiers (PCID) can be leveraged to tag the cache and translation lookaside buffer (TLB) entries with an identifier unique to the microkernel hypervisor and hypervisor application to avoid a processor cache/TLB flush on the page table address swap. Otherwise, the switch in the page table base address could be a very expensive swap.

In FIG. 8, a trap 840 is shown directed to hypervisor application 830a. Hypervisor application 830a is to invoke processing of hypervisor application 830b to perform the key activity to service the trap. Because the hypervisor application 830a, which basically serves as a gateway to invoke another hypervisor application, has access to only a limited amount of guest VM memory, and therefore a limited about of, if any, direct-mapped memory of the guest VM, the page table(s) 834a for hypervisor application 830a can be relatively small and limited in terms of the guest VM memory that they map to. The page tables 834b for hypervisor application 830b, which in this example performs trap handling processing that requires broader (but still limited) access to guest VM memory could map to a different portion of guest VM memory for access to other guest VM data. In this manner, each hypervisor application can have a relatively small portion of guest VM memory (and relatively small, if any, portion of direct map guest VM memory), and if access is needed to other guest VM memory to perform function(s), such as those that hypervisor application is not configured to perform, then the instead of the hypervisor application having access to that memory it is to call to whichever hypervisor application does have access to that memory to perform functions to service the request. This reduces the size of the guest VM memory, including the direct map, available at any given time in hypervisor processing and therefore reduces the attack surface. In this embodiment, upon an exit/trap from guest VM 810 for hypervisor processing, the microkernel hypervisor can place into the PTBR/CR3 the address of page table(s) 834a for the limited execution of application 830a. Then when hypervisor application 830a invokes (e.g. via a request to the microkernel hypervisor) execution of hypervisor application 830b to perform the rest of the request for hypervisor processing, the microkernel hypervisor places into the PTBR/CR3 the address of page table(s) 834b and executes hypervisor application 830b.

A gateway hypervisor application, such as application 830a, can determine what type of processing is to be performed to handle the trap, and on this basis invoke the microkernel hypervisor to load the correct hypervisor application to service the request. This dictates the page table address for the microkernel hypervisor to load next.

Figure 9:
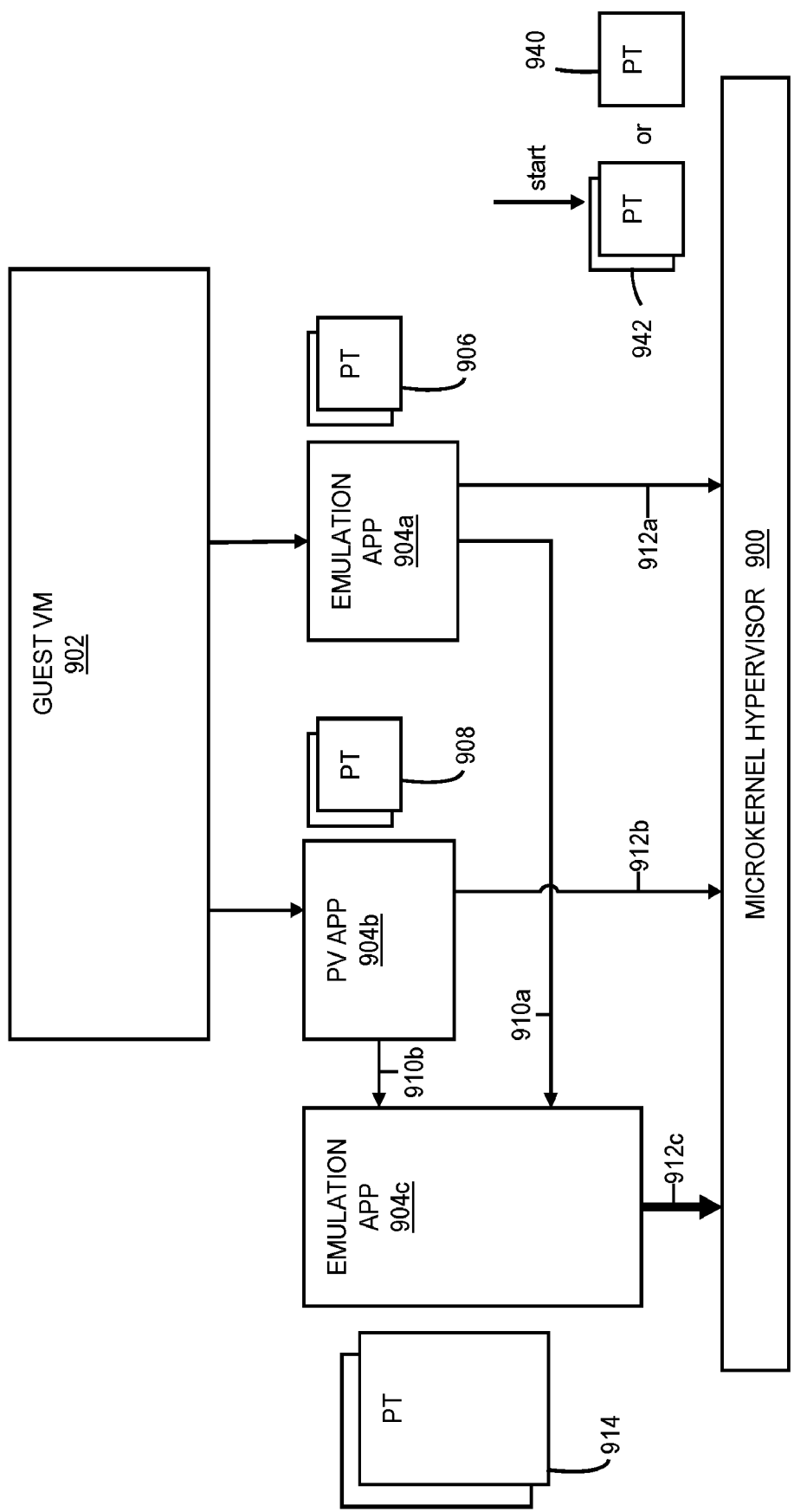
FIGS. 9 and 10 present example embodiments for trap handling by hypervisor applications, in accordance with aspects described herein.
Figure 10:
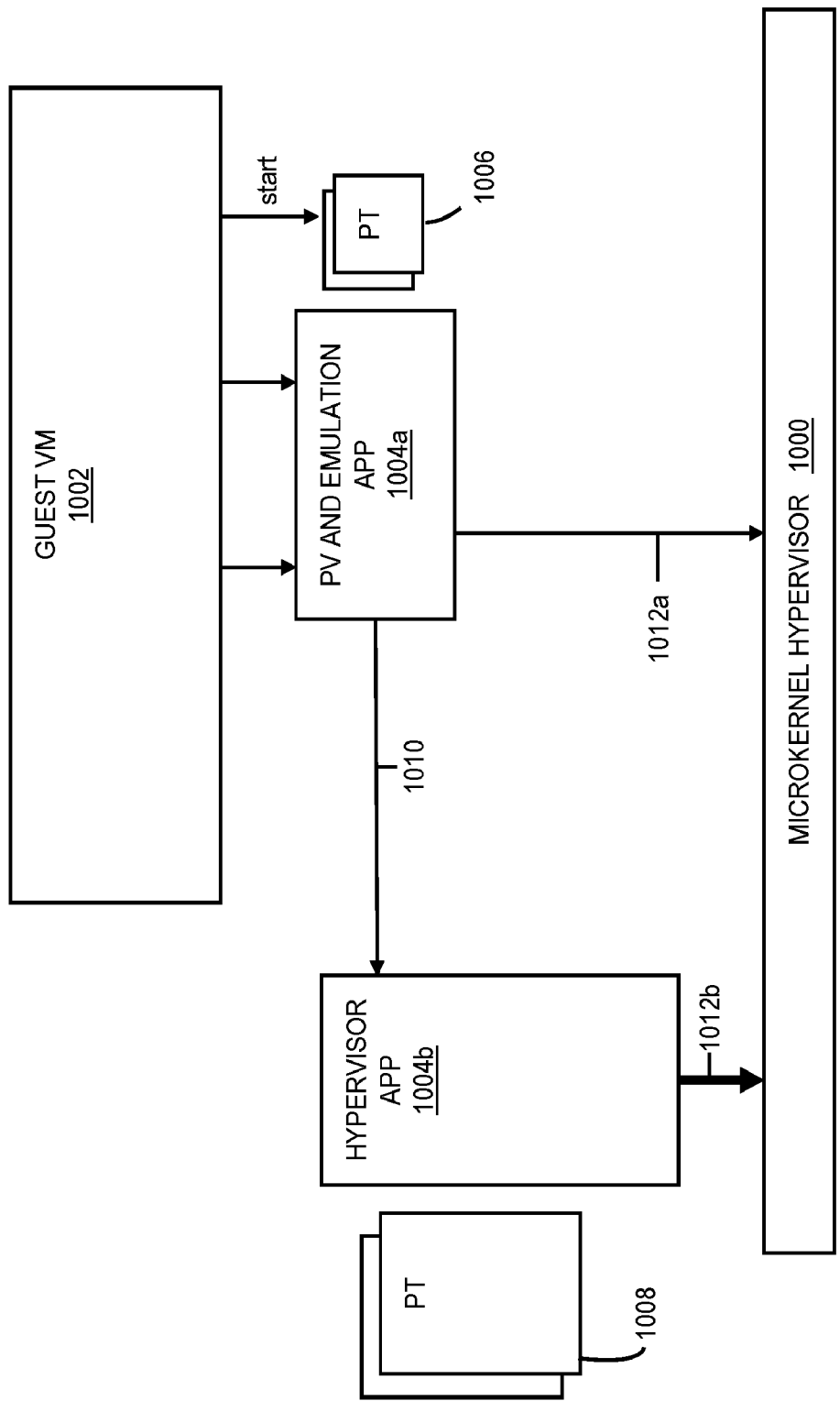

FIGS. 9 and 10 present two different embodiments with respect to initial trap handling by hypervisor applications. FIG. 9 depicts an example of initial trap handling by either of two hypervisor applications depending on the class of trap. Initially on a trap to the host, the trap goes down to the microkernel hypervisor 900 meaning that the hardware executes the microkernel hypervisor first. The microkernel hypervisor execution uses a set of page tables that may or may not be specific to the particular guest VM 902 that initiated the trap. In the case where there is just one set of page tables for microkernel hypervisor execution to handle the trap, it uses those page tables. In the case where a different set is provided per guest VM, it uses one of the sets of page tables, i.e. the one for whichever guest VM initiated the trap. Here there are two such sets of page tables 940, 942 to correspond to the two guest VMs (in this example) that are hosted by the hypervisor. In any case, the address of the appropriate set of page tables 940/942 is loaded into PTBR/CR3 for this initial microkernel hypervisor execution. It is noted that page tables 940/942 could map-in whichever amount of guest VM memory is needed for the microkernel hypervisor to identify which hypervisor application is to handle the trap, and for this reason may map-in only a very limited amount of guest VM memory, perhaps even just a single page.

The microkernel hypervisor's limited role in this portion of trap handling is to identify which of two hypervisor applications 904a, 904b is to handle the trap. The two hypervisor applications 904a, 904b handle different classes of trap. For instance, hypervisor application 904b is to handle hypervisor processing for paravirtualization calls (for instance a VMCALL instruction), while the other hypervisor application 904a is to handle hypervisor processing for all other types of traps (e.g. emulation functions to emulate some existing part of physical hardware). The microkernel hypervisor 900 determines what type of exit/trap occurred and then dispatches the handling to the appropriate hypervisor application 904a, 904b by initiating execution of the appropriate hypervisor application 904a, 904b to service the request. In so doing, it causes a switch of the PTBR/CR3 to hold the address of the appropriate set of page tables to use. The appropriate set for hypervisor application 904a to use if invoked is one of the sets of page tables 906, i.e. whichever of the two sets corresponds to guest VM 902 that initiated the trap. The appropriate set for hypervisor application 904b to use if invoked is one of the two sets of page tables 908, i.e. whichever of the two sets corresponds to guest VM 902 that initiated the trap.

The handling of the request for hypervisor processing by hypervisor application 904a or 904b is relatively limited in this particular example; applications 904a, 904b are gateway hypervisor applications here in that they identify yet another hypervisor application to invoke for further hypervisor processing to service the request. This enables their page tables to map in only the necessary portion of guest VM memory that they need to accomplish their particular functions. The further hypervisor processing can be the substantive processing to substantively fulfill the request—e.g. paravirtualization processing, actual instruction emulation, etc. Here, the substantive processing for either class of trap is handled by the single hypervisor application 904c. That is, both hypervisor application 904a and 904b invoke execution of hypervisor application 904c for the further handling of the hypervisor processing to service the request regardless whether the request is for paravirtualization or emulation. This invocation is conceptually depicted by interprocess communication arrows 910a, 910b in FIG. 9. The page tables 914 used for execution of hypervisor application 904c would encompass whatever guest VM memory is needed for hypervisor application 904c to accomplish its functions. It is understood that each of the hypervisor applications 904a-904c can communicate with the microkernel hypervisor 900 for various requests, which includes the invoke of execution of another hypervisor application. Thus, for hypervisor application 904a or 904b to invoke execution of hypervisor application 904c, that hypervisor application calls (912a, 912b) to the microkernel hypervisor 900 to invoke execution of hypervisor application 904c. In this example a single hypervisor application 904c handles either class of trap, but in other examples multiple other hypervisor applications are provided to handle different classes of traps and/or different tasks.

In any case, the virtual memory space for execution of hypervisor application 904c is defined by one of the sets of page tables 914. The appropriate set for hypervisor application 904c to use when its execution is invoked is the set of page tables 914 that corresponds to whichever guest VM (e.g. 902 here) initiated the trap. When the hypervisor application 904c is invoked for execution, this causes a switch of the PTBR/CR3 to hold the address of the appropriate set of page tables 914 to use.

Thus, when any given hypervisor application executes at a point in time, the set of page tables for the hypervisor application to use is specific to both itself and to the particular guest VM for which the hypervisor processing is being handled, and whichever guest VM memory for that guest VM is mapped-in by the set of page tables can be limited to just what the hypervisor application needs.

The sets of page tables 906 and 908 are shown by smaller boxes than the sets of page tables 914 in FIG. 9 to conceptually depict the breadth of virtual memory available to those hypervisor applications, the virtual memory encompassing any memory dedicated to that hypervisor application, and whichever limited portion of guest VM memory and microkernel hypervisor memory is needed for execution the hypervisor application. Hypervisor applications 904a, 904b are relatively limited in what they perform—primarily or exclusively just calling to hypervisor application 904c—and therefore their memory footprint and the guest VM memory they need to access is made appropriately small. Hypervisor application 904c is not so limited in its functions and processing and therefore is afforded a much large memory footprint holding more, and potentially sensitive, data, including other portions of guest VM memory. The communications 912c available between it and the microkernel hypervisor 900 can be more privileged and extensive as well.

Though in this example there is one hypervisor application 904c to handle the further processing after being handled by one of the gateway hypervisor applications 904a, 904b, in other examples two or more such hypervisor applications could be provided. This would further isolate the various substantive functions performed by hypervisor applications that do not interface directly with the guest VMs, thereby enabling their virtual memory spaces and requisite access to the various guest VM memories to be made even smaller than would be if just the single hypervisor application 904c were provided.

FIG. 10 depicts an alternative scenario where initial trap handling is by a single hypervisor application. All guest VM 1002 exits in this example go to hypervisor application 1004a, i.e. regardless whether the request for hypervisor processing is for paravirtualization or emulation. This may be effected in one of different ways. First, the hypervisor application 1004a could execute immediately (i.e. rather than being invoked by the microkernel hypervisor 1000) using the appropriate set of page tables 1006 to service the request. In this case, the PTBR/CR3 is loaded with the address of the appropriate set of page tables 1006 (i.e. depending on which guest VM the hypervisor processing is for) so that when the exit occurs, the hardware automatically loads that address. Alternatively, the trap could initially be to the microkernel hypervisor, which then invokes hypervisor application 1004a for trap handling regardless of the type of trap. In this latter scenario, and as described above, there may be no need for a page table swap, as the page tables 1006 could include the small amount of memory that the microkernel hypervisor would need to initially process the trap and effect the invocation of hypervisor application 1004a. In any case, the handling of the request for hypervisor processing by hypervisor application 1004a is again limited in that it identifies another hypervisor application to invoke for yet further hypervisor processing to service the request. As in the above example, there is one such other hypervisor application 1004b for the substantive hypervisor processing so hypervisor application 1004a invokes hypervisor application 1004b for execution as depicted by an interprocess communication 1010 in FIG. 10. It is understood that hypervisor application 1004a communicates 1012a with the microkernel hypervisor 1000 for this invocation.

The virtual memory space for execution of hypervisor application 1004b is defined by one of the sets of page tables 1008 and the appropriate set for hypervisor application 1004b to use when its execution is invoked is the set of page tables 1008 corresponding to whichever guest VM initiated the trap. The address of the appropriate set of page tables 1008 to use is loaded into PTBR/CR3 for execution of hypervisor application 1004b.

Again in this example, the set of page tables for any executing hypervisor application to use is specific to both itself and to the particular guest VM for which the hypervisor processing is being handled. Also, one hypervisor application 1004b handles the further, substantive processing after being handled by the gateway hypervisor application 1004a but it is understood that in other examples two or more such hypervisor applications could be provided in which case hypervisor application 1004a selects based on properties of the request which hypervisor application is to handle that request.

In any scenario, when the hypervisor application performing the substantive hypervisor processing (e.g. 904c, 1004b) to service the request has completed its exit handling, it can call down to the microkernel hypervisor to cause a switch in context or a world switch. Specifically, it can (i) call for a context switch back to the initial hypervisor application (e.g. 904a, 904b, 1004a), causing the PTBR/CR3 to switch to the appropriate set of page tables for that hypervisor application, which then could return execution to the guest VM by way of another call to the microkernel hypervisor which would load the EPT for that guest VM into PTBR/CR2, or it could instead (ii) call down to the microkernel hypervisor for a world switch back to the guest VM, in which the EPT for that guest VM is loaded into PTBR/CR2.

Figure 11A:
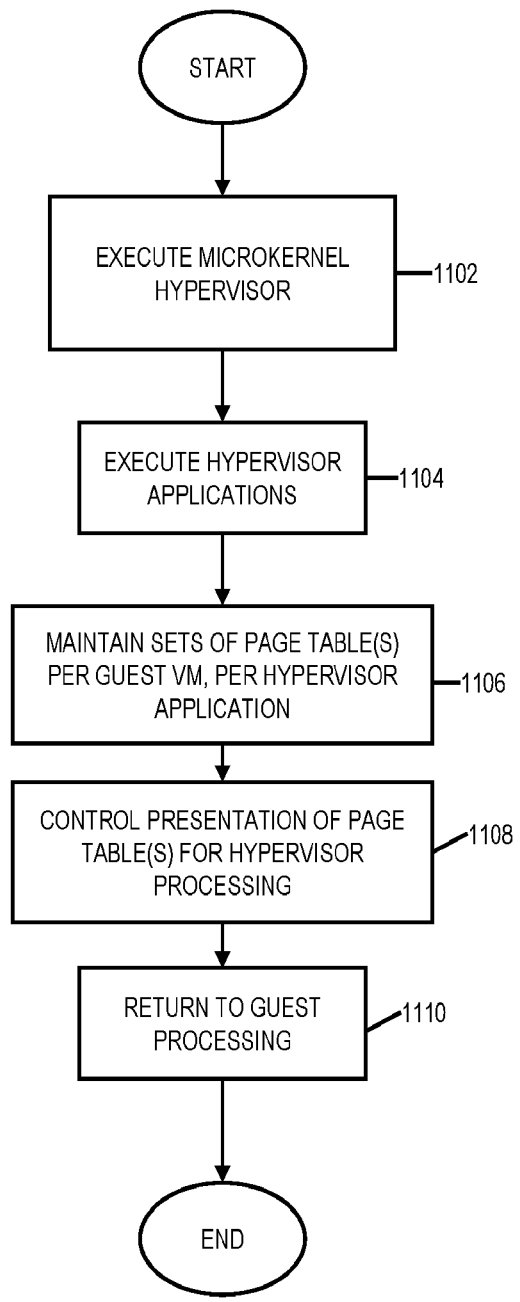
FIGS. 11A-11B depict an example process for controlling availability and accessibility of memory by executing software, in accordance with aspects described herein.
Figure 11B:
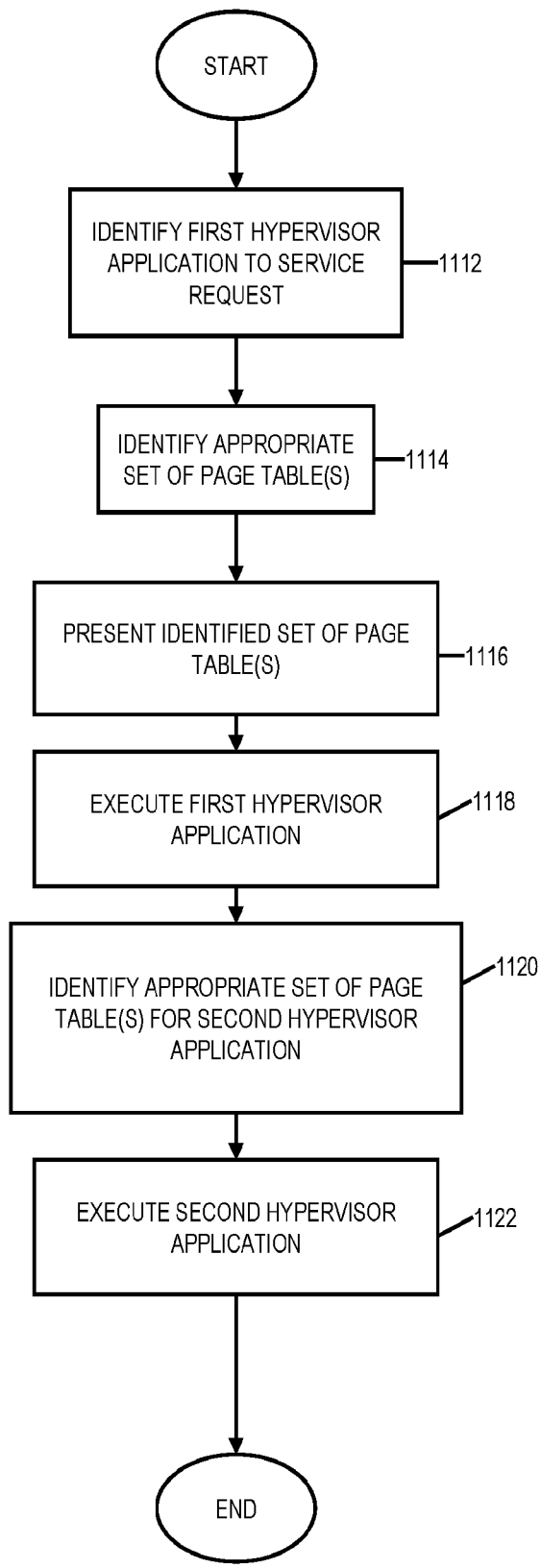

FIGS. 11A-11B depict an example process for controlling availability and accessibility of memory by executing software, in accordance with aspects described herein. In some examples, the process is performed by a computer system that implements virtualization, such computer systems as described herein, and more particularly at least some aspects could be performed by a microkernel hypervisor.

Initially the process executes (1102), on the computer system, a microkernel hypervisor with host privileges and executes (1104) a plurality of hypervisor applications with host privileges. The microkernel hypervisor is a host for a plurality of guest virtual machines (VMs) executing on the computer system with guest privileges and the plurality of hypervisor applications execute in a less privileged mode than the microkernel hypervisor. It is understood that different software (e.g. a microkernel hypervisor, hypervisor applications, guest VM) may execute on hardware processor(s) at different times depending on what software has context at any given moment. Each guest VM of the plurality of guest VMs has guest VM memory corresponding to a dedicated portion of computer system physical memory for guest VM execution. This portion of guest VM memory is dedicated to the guest VM, meaning it is not shared memory or for interprocess communication (IPC) such that it would be accessible by other software that is not part of the guest VM. Another portion of memory used by a guest VM could be shared, in which case the corresponding portion of computer system physical memory would not be a dedicated portion that is dedicated to that guest VM.

The process maintains (1106) a plurality of sets of page tables. This may be a role of the microkernel hypervisor. Each set of the plurality of sets of page tables has a respective page table address indicating a location of the set of page tables. The plurality of sets of page tables include, for each guest VM, of the plurality of guest VMs, and each hypervisor application of the plurality of hypervisor applications, a respective set of page tables corresponding to the combination of that guest VM and that hypervisor application. For any guest VM of the plurality of guest VMs and any hypervisor application of the plurality of hypervisor applications, there is a corresponding set of page tables in the plurality of sets of page tables and that corresponding set of page tables includes mappings to at most a subset of the guest VM memory to thereby limit an amount of the guest VM memory that is accessible when the corresponding set of page tables is presented for executing software. This set of page tables is unique in that it does not correspond to any other guest VM/hypervisor application combination. In embodiments, no two sets of the plurality of sets of page tables map the exact same subset of guest VM memory.

The process of FIG. 11A also controls (1108) presentation of the plurality of sets of page tables for hypervisor (host level) processing. Again this may be a function of the microkernel hypervisor. Host level processing refers to the processing on a trap to the hypervisor. Controlling the presentation of the page tables selectively presents just one of the sets of page tables at any given time during hypervisor application execution to provide access the guest VM memory, where the access to guest VM memory and the corresponding portion of the computer system memory is controlled by controlling a page table base address presented in hardware of the computer system (e.g. an architected register).

FIG. 11B depicts example processing for controlling presentation of the sets of page tables for hypervisor processing, in accordance with aspects described herein. This processing can be initiated based on a request for hypervisor processing, i.e. any trap or exit to the host. The request for processing may be a request by/for a guest VM, be it intentionally or unintentionally raised by the guest VM. The process identifies (1112) a hypervisor application of the plurality of hypervisor applications to service the request for hypervisor processing. Each request for hypervisor processing by any of the plurality of guest VMs is serviced by a selected hypervisor application of one or more hypervisor applications of the plurality of hypervisor applications. The selected hypervisor application could be a single, prespecified hypervisor application, or could be one selected by the microkernel hypervisor if the trap reaches the microkernel hypervisor first. Thus, in some examples the identification (1112) is performed by the microkernel hypervisor itself, but in other examples, such as when all traps are initially handled by a single hypervisor application, the identification is inherent and automatic.

In any case, the process identifies (1114) the set of page tables, of the plurality of sets of page tables, that corresponds to the combination of that guest VM and that hypervisor application for which the hypervisor processing was requested, and then presents (1116) that identified set of page tables. The identified set is presented for the hypervisor's access to memory, which includes for guest VM memory access by the identified hypervisor application and the microkernel hypervisor. It does this by indicating the page table address of the identified set of page tables as the page table base address in hardware for the hypervisor application and the microkernel hypervisor to use in accessing memory, including any guest VM memory that is presented by those page tables. Presenting the identified set of page tables limits the amount of guest VM memory, of that guest VM, that is accessible by that hypervisor application and the microkernel hypervisor to at most the subset of the guest VM memory to which the set of page tables includes mappings. In this manner, it limits hypervisor application and microkernel hypervisor access to guest VM memory. An example of indicating the page table address of the identified set of page tables as the page table address for the hypervisor application and the microkernel hypervisor to use includes storing the page table address of the identified set of page tables in the page table address register.

The guest VM memory can include a collection of direct-mapped physical memory pages that are dedicated for execution of that guest VM. In this case, the subset of the guest VM memory that is made accessible by the hypervisor application and the microkernel hypervisor to use by way of presenting the identified set of page tables can include at most a subset (i.e. none to just some portion less than the whole) of the collection of direct-mapped physical memory pages for execution of that guest VM. In this manner, it is never the case that the entire direct map for that guest VM is being presented to any executing software. It is also noted that the identified set of page tables for guest VM memory accessible by the identified hypervisor application and the microkernel hypervisor to use could present only a minimum amount of guest VM memory to support the execution of the hypervisor application in performing its functions in servicing the request for hypervisor processing.

There are two example scenarios discussed herein for initially identifying the hypervisor application to service the request for hypervisor processing. In the first scenario, described above with reference to FIGS. 7 and 9, the request for processing includes a trap to hypervisor processing which immediately invokes processing of the microkernel hypervisor for a determination of which hypervisor application is to service the request for hypervisor processing. In this case, the process executes the microkernel hypervisor and the microkernel hypervisor determines whether the request for hypervisor processing includes a request by the guest VM for a paravirtualization interface or a request by the guest VM for emulation of a guest instruction. The microkernel hypervisor selects, as the identified hypervisor application to service the request for hypervisor processing, between a first hypervisor application (dedicated to servicing paravirtualization interface requests) of the one or more hypervisor applications and a second hypervisor application (dedicated to servicing guest VM instruction emulation requests) of the one or more hypervisor applications. The identifying (1114) the set of page table(s) and the presenting (1116) the identified set of page table(s) for guest VM memory access identifies and presents the set of page tables corresponding to the guest VM and the selected first or second hypervisor application for execution of the selected first or second hypervisor application, which limits the amount of the guest VM memory that is accessible by that first or second hypervisor application and the microkernel hypervisor to at most a first subset of the guest VM memory.

In the second scenario, described above with reference to FIG. 10, the request for processing includes a trap to hypervisor processing which immediately invokes execution of the identified (i.e. at 1112) hypervisor application to begin servicing the request for hypervisor processing and indicates (at 1116) the page table address of the identified set of page tables as the page table base address in hardware for the hypervisor application and the microkernel hypervisor to use in accessing guest VM memory, thereby limiting the amount of guest VM memory that is accessible by the identified hypervisor application and the microkernel hypervisor to at most the subset of the guest VM memory, wherein that subset is a first subset of the guest VM memory.

Continuing with the processing of FIG. 11B, the process executes (1118) the hypervisor application. In the first scenario discussed above, it executes the selected first or second hypervisor application to begin servicing the request for hypervisor processing. In the second scenario discussed above, it executes the identified single hypervisor application (e.g. 1004*a*) to begin servicing the request for hypervisor processing. In either case the invocation is performed by a call to the microkernel hypervisor by the selected hypervisor application. At that point, whichever hypervisor application is the initial one to handle this request, it invokes execution of another ('second') hypervisor application for the further processing. In the first scenario discussed above, executing the selected first or second hypervisor application includes invoking, by the executing selected first or second hypervisor application, execution of another hypervisor application, of the plurality of hypervisor applications, for further hypervisor processing to service the request for hypervisor processing. An example is application 706*b* or 706*c* invoking execution of application 706*a*, or application 904*a* or 904*b* invoking execution of application 904*c*.

Based this invocation of the execution of the another (i.e. second) hypervisor application (830*b*, 904*c*, 1004*b*), the process identifies (1120) another set of page tables of the plurality of page tables. The another set of page tables corresponds to the guest VM and the another hypervisor application. In conjunction with identifying the another set of page tables, the process switches the page table base address in hardware to be the page table address for the another identified set of page tables, to thereby present the another set of page tables for the another hypervisor application and the microkernel hypervisor to use in accessing guest VM memory during execution of the another hypervisor application, and then executes (1122) the another hypervisor application. Presenting the another set of page tables limits the amount of guest VM memory that is accessible by the another hypervisor application and the microkernel hypervisor to at most a second subset of the guest VM memory, the second subset being a different portion of guest VM memory than the first subset from above that was presented to the first hypervisor application. Accordingly, switching execution from one hypervisor application to another hypervisor application switches the guest VM memory that is currently mapped-in from one subset to another subset. In some embodiments these aspects are performed by the microkernel hypervisor based on call to it.

Return to FIG. 11A, based on completing execution of the another/second hypervisor application (i.e. at 1122 of FIG. 11B) to complete handling of the request for hypervisor processing, the process of FIG. 11A then returns (1110) execution to guest processing. The second hypervisor application either (i) initiates a return of context to the selected first or second hypervisor application (or the single hypervisor application), which includes switching the page table base address in hardware to the page table address for the identified set of page tables for the selected first or second hypervisor application (or the one hypervisor application), or (ii) initiates a world switch back to the guest VM, which includes switching the page table base address in hardware to a page table address for a set of page tables for execution of the guest VM. Guest VM execution resumes as that point until another trap or a switch in context to another guest VM.

Although various examples are provided, variations are possible without departing from a spirit of the claimed aspects.

Figure 12:
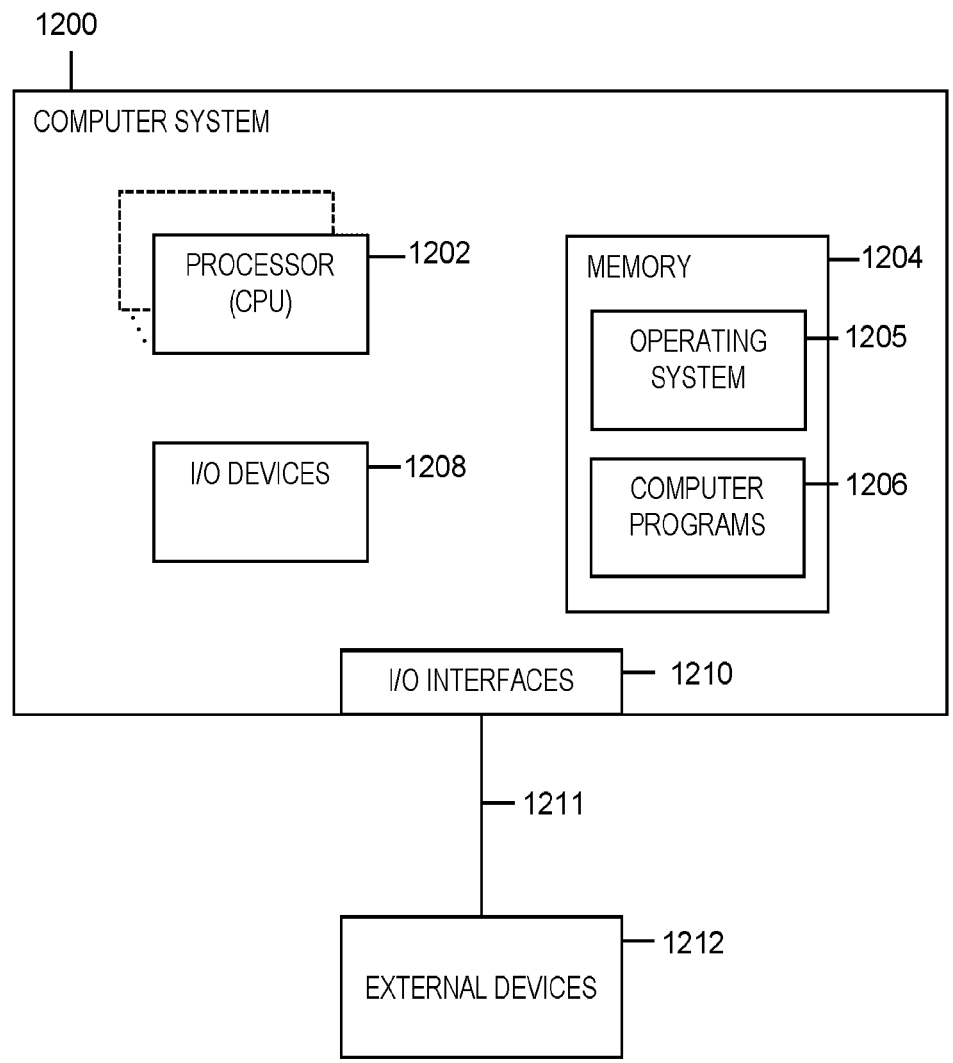
FIG. 12 depicts one example of a computer system and associated devices to incorporate and/or use aspects described herein.

Processes described herein may be performed by a computer system. FIG. 12 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 12 shows a computer system 1200 in communication with external device(s) 1212. Computer system 1200 includes one or more processor(s) 1202, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1202 can also include register(s) to be used by one or more of the functional components. Computer system 1200 also includes memory 1204, input/output (I/O) devices 1208, and I/O interfaces 1210, which may be coupled to processor(s) 1202 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1204 can be or include main or system memory (e.g. Random Access Memory) used in the execution of program instructions, storage device(s) such as hard drive(s), flash media, or optical media as examples, and/or cache memory, as examples. Memory 1204 can include, for instance, a cache, such as a shared cache, which may be coupled to local caches (examples include L1 cache, L2 cache, etc.) of processor(s) 1202. Additionally, memory 1204 may be or include at least one computer program product having a set (e.g., at least one) of program modules, instructions, code or the like that is/are configured to carry out functions of embodiments described herein when executed by one or more processors.

Memory 1204 can store an operating system 1205 and other computer programs 1206, such as one or more computer programs/applications that execute to perform aspects described herein. Specifically, programs/applications can include computer readable program instructions that may be configured to carry out functions of embodiments of aspects described herein.

Examples of I/O devices 1208 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1212) coupled to the computer system through one or more I/O interfaces 1210.

Computer system 1200 may communicate with one or more external devices 1212 via one or more I/O interfaces 1210. Example external devices include a keyboard, a pointing device, a display, and/or any other devices that enable a user to interact with computer system 1200. Other example external devices include any device that enables computer system 1200 to communicate with one or more other computing systems or peripheral devices such as a printer. A network interface/adapter is an example I/O interface that enables computer system 1200 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 1210 and external devices 1212 can occur across wired and/or wireless communications link(s) 1211, such as Ethernet-based wired or wireless connections. Example wireless connections include cellular, Wi-Fi, Bluetooth®, proximity-based, near-field, or other types of wireless connections. More generally, communications link(s) 1211 may be any appropriate wireless and/or wired communication link(s) for communicating data.

Particular external device(s) 1212 may include one or more data storage devices, which may store one or more programs, one or more computer readable program instructions, and/or data, etc. Computer system 1200 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1200 may be operational with numerous other general purpose or special purpose computing system environments or configurations. Computer system 1200 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

Aspects of the present invention may be a system, a method, and/or a computer program product, any of which may be configured to perform or facilitate aspects described herein.

In some embodiments, aspects of the present invention may take the form of a computer program product, which may be embodied as computer readable medium(s). A computer readable medium may be a tangible storage device/medium having computer readable program code/instructions stored thereon. Example computer readable medium(s) include, but are not limited to, electronic, magnetic, optical, or semiconductor storage devices or systems, or any combination of the foregoing. Example embodiments of a computer readable medium include a hard drive or other mass-storage device, an electrical connection having wires, random access memory (RAM), read-only memory (ROM), erasable-programmable read-only memory such as EPROM or flash memory, an optical fiber, a portable computer disk/diskette, such as a compact disc read-only memory (CD-ROM) or Digital Versatile Disc (DVD), an optical storage device, a magnetic storage device, or any combination of the foregoing. The computer readable medium may be readable by a processor, processing unit, or the like, to obtain data (e.g. instructions) from the medium for execution. In a particular example, a computer program product is or includes one or more computer readable media that includes/stores computer readable program code to provide and facilitate one or more aspects described herein.

As noted, program instruction contained or stored in/on a computer readable medium can be obtained and executed by any of various suitable components such as a processor of a computer system to cause the computer system to behave and function in a particular manner. Such program instructions for carrying out operations to perform, achieve, or facilitate aspects described herein may be written in, or compiled from code written in, any desired programming language. In some embodiments, such programming language includes object-oriented and/or procedural programming languages such as C, C++, C #, Java, etc.

Program code can include one or more program instructions obtained for execution by one or more processors. Computer program instructions may be provided to one or more processors of, e.g., one or more computer systems, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

Although various embodiments are described above, these are only examples. Provided is a small sampling of embodiments of the present disclosure, as described herein:

A1. A computer-implemented method comprising: maintaining a plurality of sets of page tables for a computer system executing a microkernel hypervisor with host privileges, the microkernel hypervisor hosting a plurality of guest virtual machines (VMs) executing with guest privileges, each guest VM of the plurality of guest VMs having guest VM memory corresponding to a dedicated portion of computer system physical memory for guest VM execution, wherein the plurality of sets of page tables comprise, for each guest VM of the plurality of guest VMs and each hypervisor application of the plurality of hypervisor applications, a respective set of page tables corresponding to the combination of that guest VM and that hypervisor application, wherein, for any guest VM of the plurality of guest VMs and any hypervisor application of the plurality of hypervisor applications, there is a corresponding set of page tables of the plurality of sets of page tables that maps guest virtual memory to computer system physical memory and the corresponding set of page tables includes mappings to at most a subset of the guest VM memory to thereby limit an amount of the guest VM memory that is accessible when the corresponding set of page tables is presented for executing software; and controlling presentation of the plurality of sets of page tables for hypervisor processing, wherein the controlling presentation selectively presents just one of the sets of page tables at any given time during hypervisor application execution to provide access to guest VM memory, wherein access to guest VM memory and the corresponding portion of the computer system physical memory is controlled by controlling a page table base address presented in hardware of the computer system, and wherein the controlling presentation comprises, based on a request for hypervisor processing for a guest VM of the plurality of guest VMs: identifying a hypervisor application of the plurality of hypervisor applications to service the request for hypervisor processing; identifying the set of page tables, of the plurality of sets of page tables, that corresponds to the combination of the identified hypervisor application and the guest VM for which the hypervisor processing was requested; and presenting the identified set of page tables for guest VM memory access by the identified hypervisor application and the microkernel hypervisor by indicating a page table address of the identified set of page tables as the page table base address in hardware for the hypervisor application and the microkernel hypervisor to use in accessing guest VM memory, wherein presenting the identified set of page tables limits the amount of guest VM memory, of that guest VM, that is accessible by that hypervisor application and the microkernel hypervisor to at most the subset of the guest VM memory.

A2. The method of A1, wherein the guest VM memory comprises a collection of direct-mapped physical memory pages for guest VM execution, and wherein the subset of the guest VM memory made accessible by the hypervisor application and the microkernel hypervisor to use comprises at most a subset of the collection of direct-mapped physical memory pages for guest VM execution.

A3. The method of A1 or A2, wherein the identified set of page tables for guest VM memory accessible by the identified hypervisor application and the microkernel hypervisor to use present only a minimum amount of guest VM memory to support execution of the hypervisor application in performing its functions in servicing the request for hypervisor processing.

A4. The method of A1, A2, or A3, wherein each request for hypervisor processing by any of the plurality of guest VMs is serviced by a selected hypervisor application of one or more hypervisor applications of the plurality of hypervisor applications.

A5. The method of A4, wherein the request for processing comprises a trap to hypervisor processing which immediately invokes processing of the microkernel hypervisor for a determination of which hypervisor application is to service the request for hypervisor processing, wherein the method further comprises: executing the microkernel hypervisor and determining, by the microkernel hypervisor, whether the request for hypervisor processing comprises a request by the guest VM for a paravirtualization interface or a request by the guest VM for emulation of a guest instruction; selecting, as the identified hypervisor application to service the request for hypervisor processing, between a first hypervisor application of the one or more hypervisor applications and a second hypervisor application of the one or more hypervisor applications, the first hypervisor application being dedicated to servicing paravirtualization interface requests, and the second hypervisor application being dedicated to servicing guest VM instruction emulation requests, wherein the identifying the set of page tables and the presenting the identified set of page tables for guest VM memory access identifies and presents the set of page tables corresponding to the guest VM and the selected first or second hypervisor application for execution of the selected first or second hypervisor application, which limits the amount of the guest VM memory that is accessible by that first or second hypervisor application and the microkernel hypervisor to at most a first subset of the guest VM memory; executing the selected first or second hypervisor application to begin servicing the request for hypervisor processing, wherein the executing the selected first or second hypervisor application comprises invoking, by the executing selected first or second hypervisor application, execution of another hypervisor application, of the plurality of hypervisor applications, for further hypervisor processing to service the request for hypervisor processing, wherein the invoking is performed by a call to the microkernel hypervisor by the selected first or second hypervisor application; based on invoking execution of the another hypervisor application, identifying another set of page tables of the plurality of page tables, which corresponds to the guest VM and the another hypervisor application, and switching the page table base address in hardware to be the page table address for the another identified set of page tables, to thereby present the another set of page tables for the another hypervisor application and the microkernel hypervisor to use in accessing guest VM memory during execution of the another hypervisor application, wherein presenting the another set of page tables limits the amount of guest VM memory that is accessible by the another hypervisor application and the microkernel hypervisor to at most a second subset of the guest VM memory, the second subset being a different portion of guest VM memory than the first subset; and based on completing execution of the another hypervisor application to complete handling of the request for hypervisor processing, either (i) initiating a return of context to the selected first or second hypervisor application, which includes switching the page table base address in hardware to the page table address for the identified set of page tables for the selected first or second hypervisor application, or (ii) initiating a world switch back to the guest VM, which includes switching the page table base address in hardware to a page table address for a set of page tables for execution of the guest VM.

A6. The method of A4, wherein the request for processing comprises a trap to hypervisor processing which invokes execution of the identified hypervisor application to begin servicing the request for hypervisor processing and indicates the page table address of the identified set of page tables as the page table base address in hardware for the hypervisor application and the microkernel hypervisor to use in accessing guest VM memory, thereby limiting the amount of guest VM memory that is accessible by the identified hypervisor application and the microkernel hypervisor to at most the subset of the guest VM memory, wherein the subset is a first subset of the guest VM memory, and wherein the method further comprises: the identified hypervisor application, as part of its execution, invoking execution of another hypervisor application, of the plurality of hypervisor applications, for further hypervisor processing to service the request for hypervisor processing, wherein the invoking is performed by a call to the microkernel hypervisor by the identified hypervisor application; based on invoking execution of the another hypervisor application, identifying another set of page tables of the plurality of page tables, which corresponds to the guest VM and the another hypervisor application, and switching the page table base address in hardware to the page table address for the another identified set of page tables, to thereby present the another set of page tables for the another hypervisor application and the microkernel hypervisor to use in accessing guest VM memory during execution of the another hypervisor application, wherein presenting the another set of page tables limits the amount of guest VM memory that is accessible by the another hypervisor application and the microkernel hypervisor to at most a second subset of the guest VM memory, the second subset being a different portion of guest VM memory than the first subset; and based on completing execution of the another hypervisor application to complete handling of the request for hypervisor processing, either (i) initiating a return of context to the hypervisor application, which includes switching the page table base address in hardware to the page table address for the identified set of page tables for the identified hypervisor application, or (ii) initiating a world switch back to the guest VM, which includes switching the page table base address in hardware to be a page table address for a set of page tables for execution of the guest VM.

A7. The method of A4, A5, or A6, wherein one hypervisor application of the plurality of hypervisor applications is invoked for execution only in response to invocation by a different hypervisor application of the plurality of hypervisor applications.

A8. The method of A1, A2, A3, A4, A5, A6, or A7, wherein the page table base address is provided in hardware in a page table address register, and wherein the indicating the page table address of the identified set of page tables comprises storing the page table address of the identified set of page tables in the page table address register.

B1. A computer system comprising: a memory; and a processor in communication with the memory, wherein the computer system is configured to perform a method comprising: maintaining a plurality of sets of page tables for a computer system executing a microkernel hypervisor with host privileges, the microkernel hypervisor hosting a plurality of guest virtual machines (VMs) executing with guest privileges, each guest VM of the plurality of guest VMs having guest VM memory corresponding to a dedicated portion of computer system physical memory for guest VM execution, wherein the plurality of sets of page tables comprise, for each guest VM of the plurality of guest VMs and each hypervisor application of the plurality of hypervisor applications, a respective set of page tables corresponding to the combination of that guest VM and that hypervisor application, wherein, for any guest VM of the plurality of guest VMs and any hypervisor application of the plurality of hypervisor applications, there is a corresponding set of page tables of the plurality of sets of page tables that maps guest virtual memory to computer system physical memory and the corresponding set of page tables includes mappings to at most a subset of the guest VM memory to thereby limit an amount of the guest VM memory that is accessible when the corresponding set of page tables is presented for executing software; and controlling presentation of the plurality of sets of page tables for hypervisor processing, wherein the controlling presentation selectively presents just one of the sets of page tables at any given time during hypervisor application execution to provide access to guest VM memory, wherein access to guest VM memory and the corresponding portion of the computer system physical memory is controlled by controlling a page table base address presented in hardware of the computer system, and wherein the controlling presentation comprises, based on a request for hypervisor processing for a guest VM of the plurality of guest VMs: identifying a hypervisor application of the plurality of hypervisor applications to service the request for hypervisor processing; identifying the set of page tables, of the plurality of sets of page tables, that corresponds to the combination of the identified hypervisor application and the guest VM for which the hypervisor processing was requested; and presenting the identified set of page tables for guest VM memory access by the identified hypervisor application and the microkernel hypervisor by indicating a page table address of the identified set of page tables as the page table base address in hardware for the hypervisor application and the microkernel hypervisor to use in accessing guest VM memory, wherein presenting the identified set of page tables limits the amount of guest VM memory, of that guest VM, that is accessible by that hypervisor application and the microkernel hypervisor to at most the subset of the guest VM memory.

B2. The computer system of B1, wherein the guest VM memory comprises a collection of direct-mapped physical memory pages for guest VM execution, and wherein the subset of the guest VM memory made accessible by the hypervisor application and the microkernel hypervisor to use comprises at most a subset of the collection of direct-mapped physical memory pages for guest VM execution.

B3. The computer system of B1 or B2, wherein the identified set of page tables for guest VM memory accessible by the identified hypervisor application and the microkernel hypervisor to use present only a minimum amount of guest VM memory to support execution of the hypervisor application in performing its functions in servicing the request for hypervisor processing.

B4. The computer system of B1, B2, or B3, wherein each request for hypervisor processing by any of the plurality of guest VMs is serviced by a selected hypervisor application of one or more hypervisor applications of the plurality of hypervisor applications.

B5. The computer system of B4, wherein the request for processing comprises a trap to hypervisor processing which immediately invokes processing of the microkernel hypervisor for a determination of which hypervisor application is to service the request for hypervisor processing, wherein the method further comprises: executing the microkernel hypervisor and determining, by the microkernel hypervisor, whether the request for hypervisor processing comprises a request by the guest VM for a paravirtualization interface or a request by the guest VM for emulation of a guest instruction; selecting, as the identified hypervisor application to service the request for hypervisor processing, between a first hypervisor application of the one or more hypervisor applications and a second hypervisor application of the one or more hypervisor applications, the first hypervisor application being dedicated to servicing paravirtualization interface requests, and the second hypervisor application being dedicated to servicing guest VM instruction emulation requests, wherein the identifying the set of page tables and the presenting the identified set of page tables for guest VM memory access identifies and presents the set of page tables corresponding to the guest VM and the selected first or second hypervisor application for execution of the selected first or second hypervisor application, which limits the amount of the guest VM memory that is accessible by that first or second hypervisor application and the microkernel hypervisor to at most a first subset of the guest VM memory; executing the selected first or second hypervisor application to begin servicing the request for hypervisor processing, wherein the executing the selected first or second hypervisor application comprises invoking, by the executing selected first or second hypervisor application, execution of another hypervisor application, of the plurality of hypervisor applications, for further hypervisor processing to service the request for hypervisor processing, wherein the invoking is performed by a call to the microkernel hypervisor by the selected first or second hypervisor application; based on invoking execution of the another hypervisor application, identifying another set of page tables of the plurality of page tables, which corresponds to the guest VM and the another hypervisor application, and switching the page table base address in hardware to be the page table address for the another identified set of page tables, to thereby present the another set of page tables for the another hypervisor application and the microkernel hypervisor to use in accessing guest VM memory during execution of the another hypervisor application, wherein presenting the another set of page tables limits the amount of guest VM memory that is accessible by the another hypervisor application and the microkernel hypervisor to at most a second subset of the guest VM memory, the second subset being a different portion of guest VM memory than the first subset; and based on completing execution of the another hypervisor application to complete handling of the request for hypervisor processing, either (i) initiating a return of context to the selected first or second hypervisor application, which includes switching the page table base address in hardware to the page table address for the identified set of page tables for the selected first or second hypervisor application, or (ii) initiating a world switch back to the guest VM, which includes switching the page table base address in hardware to a page table address for a set of page tables for execution of the guest VM.

B6. The computer system of B4, wherein the request for processing comprises a trap to hypervisor processing which invokes execution of the identified hypervisor application to begin servicing the request for hypervisor processing and indicates the page table address of the identified set of page tables as the page table base address in hardware for the hypervisor application and the microkernel hypervisor to use in accessing guest VM memory, thereby limiting the amount of guest VM memory that is accessible by the identified hypervisor application and the microkernel hypervisor to at most the subset of the guest VM memory, wherein the subset is a first subset of the guest VM memory, and wherein the method further comprises: the identified hypervisor application, as part of its execution, invoking execution of another hypervisor application, of the plurality of hypervisor applications, for further hypervisor processing to service the request for hypervisor processing, wherein the invoking is performed by a call to the microkernel hypervisor by the identified hypervisor application; based on invoking execution of the another hypervisor application, identifying another set of page tables of the plurality of page tables, which corresponds to the guest VM and the another hypervisor application, and switching the page table base address in hardware to the page table address for the another identified set of page tables, to thereby present the another set of page tables for the another hypervisor application and the microkernel hypervisor to use in accessing guest VM memory during execution of the another hypervisor application, wherein presenting the another set of page tables limits the amount of guest VM memory that is accessible by the another hypervisor application and the microkernel hypervisor to at most a second subset of the guest VM memory, the second subset being a different portion of guest VM memory than the first subset; and based on completing execution of the another hypervisor application to complete handling of the request for hypervisor processing, either (i) initiating a return of context to the hypervisor application, which includes switching the page table base address in hardware to the page table address for the identified set of page tables for the identified hypervisor application, or (ii) initiating a world switch back to the guest VM, which includes switching the page table base address in hardware to be a page table address for a set of page tables for execution of the guest VM.

B7. The computer system of B4, B5, or B6, wherein one hypervisor application of the plurality of hypervisor applications is invoked for execution only in response to invocation by a different hypervisor application of the plurality of hypervisor applications.

B8. The computer system of B1, B2, B3, B4, B5, B6, or B7, wherein the page table base address is provided in hardware in a page table address register, and wherein the indicating the page table address of the identified set of page tables comprises storing the page table address of the identified set of page tables in the page table address register.

C1. A computer system comprising: a memory; and a processor in communication with the memory, wherein the computer system is configured to perform a method comprising: maintaining a plurality of sets of page tables for a computer system executing a microkernel hypervisor with host privileges, the microkernel hypervisor hosting a plurality of guest virtual machines (VMs) executing with guest privileges, each guest VM of the plurality of guest VMs having guest VM memory corresponding to a dedicated portion of computer system physical memory for guest VM execution, wherein the plurality of sets of page tables comprise, for each guest VM of the plurality of guest VMs and each hypervisor application of the plurality of hypervisor applications, a respective set of page tables corresponding to the combination of that guest VM and that hypervisor application, wherein, for any guest VM of the plurality of guest VMs and any hypervisor application of the plurality of hypervisor applications, there is a corresponding set of page tables of the plurality of sets of page tables that maps guest virtual memory to computer system physical memory and the corresponding set of page tables includes mappings to at most a subset of the guest VM memory to thereby limit an amount of the guest VM memory that is accessible when the corresponding set of page tables is presented for executing software; and controlling presentation of the plurality of sets of page tables for hypervisor processing, wherein the controlling presentation selectively presents just one of the sets of page tables at any given time during hypervisor application execution to provide access to guest VM memory, wherein access to guest VM memory and the corresponding portion of the computer system physical memory is controlled by controlling a page table base address presented in hardware of the computer system, and wherein the controlling presentation comprises, based on a request for hypervisor processing for a guest VM of the plurality of guest VMs: identifying a hypervisor application of the plurality of hypervisor applications to service the request for hypervisor processing; identifying the set of page tables, of the plurality of sets of page tables, that corresponds to the combination of the identified hypervisor application and the guest VM for which the hypervisor processing was requested; and presenting the identified set of page tables for guest VM memory access by the identified hypervisor application and the microkernel hypervisor by indicating a page table address of the identified set of page tables as the page table base address in hardware for the hypervisor application and the microkernel hypervisor to use in accessing guest VM memory, wherein presenting the identified set of page tables limits the amount of guest VM memory, of that guest VM, that is accessible by that hypervisor application and the microkernel hypervisor to at most the subset of the guest VM memory.

C2. The computer system of C1, wherein the guest VM memory comprises a collection of direct-mapped physical memory pages for guest VM execution, and wherein the subset of the guest VM memory made accessible by the hypervisor application and the microkernel hypervisor to use comprises at most a subset of the collection of direct-mapped physical memory pages for guest VM execution.

C3. The computer system of C1 or C2, wherein the identified set of page tables for guest VM memory accessible by the identified hypervisor application and the microkernel hypervisor to use present only a minimum amount of guest VM memory to support execution of the hypervisor application in performing its functions in servicing the request for hypervisor processing.

C4. The computer system of C1, C2, or C3, wherein each request for hypervisor processing by any of the plurality of guest VMs is serviced by a selected hypervisor application of one or more hypervisor applications of the plurality of hypervisor applications.

C5. The computer system of C4, wherein the request for processing comprises a trap to hypervisor processing which immediately invokes processing of the microkernel hypervisor for a determination of which hypervisor application is to service the request for hypervisor processing, wherein the method further comprises: executing the microkernel hypervisor and determining, by the microkernel hypervisor, whether the request for hypervisor processing comprises a request by the guest VM for a paravirtualization interface or a request by the guest VM for emulation of a guest instruction; selecting, as the identified hypervisor application to service the request for hypervisor processing, between a first hypervisor application of the one or more hypervisor applications and a second hypervisor application of the one or more hypervisor applications, the first hypervisor application being dedicated to servicing paravirtualization interface requests, and the second hypervisor application being dedicated to servicing guest VM instruction emulation requests, wherein the identifying the set of page tables and the presenting the identified set of page tables for guest VM memory access identifies and presents the set of page tables corresponding to the guest VM and the selected first or second hypervisor application for execution of the selected first or second hypervisor application, which limits the amount of the guest VM memory that is accessible by that first or second hypervisor application and the microkernel hypervisor to at most a first subset of the guest VM memory; executing the selected first or second hypervisor application to begin servicing the request for hypervisor processing, wherein the executing the selected first or second hypervisor application comprises invoking, by the executing selected first or second hypervisor application, execution of another hypervisor application, of the plurality of hypervisor applications, for further hypervisor processing to service the request for hypervisor processing, wherein the invoking is performed by a call to the microkernel hypervisor by the selected first or second hypervisor application; based on invoking execution of the another hypervisor application, identifying another set of page tables of the plurality of page tables, which corresponds to the guest VM and the another hypervisor application, and switching the page table base address in hardware to be the page table address for the another identified set of page tables, to thereby present the another set of page tables for the another hypervisor application and the microkernel hypervisor to use in accessing guest VM memory during execution of the another hypervisor application, wherein presenting the another set of page tables limits the amount of guest VM memory that is accessible by the another hypervisor application and the microkernel hypervisor to at most a second subset of the guest VM memory, the second subset being a different portion of guest VM memory than the first subset; and based on completing execution of the another hypervisor application to complete handling of the request for hypervisor processing, either (i) initiating a return of context to the selected first or second hypervisor application, which includes switching the page table base address in hardware to the page table address for the identified set of page tables for the selected first or second hypervisor application, or (ii) initiating a world switch back to the guest VM, which includes switching the page table base address in hardware to a page table address for a set of page tables for execution of the guest VM.

C6. The computer system of C4, wherein the request for processing comprises a trap to hypervisor processing which invokes execution of the identified hypervisor application to begin servicing the request for hypervisor processing and indicates the page table address of the identified set of page tables as the page table base address in hardware for the hypervisor application and the microkernel hypervisor to use in accessing guest VM memory, thereby limiting the amount of guest VM memory that is accessible by the identified hypervisor application and the microkernel hypervisor to at most the subset of the guest VM memory, wherein the subset is a first subset of the guest VM memory, and wherein the method further comprises: the identified hypervisor application, as part of its execution, invoking execution of another hypervisor application, of the plurality of hypervisor applications, for further hypervisor processing to service the request for hypervisor processing, wherein the invoking is performed by a call to the microkernel hypervisor by the identified hypervisor application; based on invoking execution of the another hypervisor application, identifying another set of page tables of the plurality of page tables, which corresponds to the guest VM and the another hypervisor application, and switching the page table base address in hardware to the page table address for the another identified set of page tables, to thereby present the another set of page tables for the another hypervisor application and the microkernel hypervisor to use in accessing guest VM memory during execution of the another hypervisor application, wherein presenting the another set of page tables limits the amount of guest VM memory that is accessible by the another hypervisor application and the microkernel hypervisor to at most a second subset of the guest VM memory, the second subset being a different portion of guest VM memory than the first subset; and based on completing execution of the another hypervisor application to complete handling of the request for hypervisor processing, either (i) initiating a return of context to the hypervisor application, which includes switching the page table base address in hardware to the page table address for the identified set of page tables for the identified hypervisor application, or (ii) initiating a world switch back to the guest VM, which includes switching the page table base address in hardware to be a page table address for a set of page tables for execution of the guest VM.

C7. The computer system of C4, C5, or C6, wherein one hypervisor application of the plurality of hypervisor applications is invoked for execution only in response to invocation by a different hypervisor application of the plurality of hypervisor applications.

C8. The computer system of C1, C2, C3, C4, C5, C6, or C7, wherein the page table base address is provided in hardware in a page table address register, and wherein the indicating the page table address of the identified set of page tables comprises storing the page table address of the identified set of page tables in the page table address register.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
maintaining a plurality of sets of page tables for a computer system executing a microkernel hypervisor with host privileges, the microkernel hypervisor hosting a plurality of guest virtual machines (VMs) executing with guest privileges, each guest VM of the plurality of guest VMs having guest VM memory corresponding to a dedicated portion of computer system physical memory for guest VM execution, wherein the plurality of sets of page tables comprise, for each guest VM of the plurality of guest VMs and each hypervisor application of a plurality of hypervisor applications, a respective set of page tables corresponding to the combination of that guest VM and that hypervisor application, wherein, for any guest VM of the plurality of guest VMs and any hypervisor application of the plurality of hypervisor applications, there is a corresponding set of page tables of the plurality of sets of page tables that maps guest virtual memory to computer system physical memory and the corresponding set of page tables includes mappings to at most a subset of the guest VM memory to thereby limit an amount of the guest VM memory that is accessible when the corresponding set of page tables is presented for executing software; and
controlling presentation of the plurality of sets of page tables for hypervisor processing, wherein the controlling presentation selectively presents just one of the sets of page tables at any given time during hypervisor application execution to provide access to guest VM memory, wherein access to guest VM memory and the corresponding portion of the computer system physical memory is controlled by controlling a page table base address presented in hardware of the computer system, and wherein the controlling presentation comprises, based on a request for hypervisor processing for a guest VM of the plurality of guest VMs:
identifying a hypervisor application of the plurality of hypervisor applications to service the request for hypervisor processing;
identifying the set of page tables, of the plurality of sets of page tables, that corresponds to the combination of the identified hypervisor application and the guest VM for which the hypervisor processing was requested; and
presenting the identified set of page tables for guest VM memory access by the identified hypervisor application and the microkernel hypervisor by indicating a page table address of the identified set of page tables as the page table base address in hardware for the hypervisor application and the microkernel hypervisor to use in accessing guest VM memory, wherein presenting the identified set of page tables limits the amount of guest VM memory, of that guest VM, that is accessible by that hypervisor application and the microkernel hypervisor to at most the subset of the guest VM memory.

2. The method of claim 1, wherein the guest VM memory comprises a collection of direct-mapped physical memory pages for guest VM execution, and wherein the subset of the guest VM memory made accessible by the hypervisor application and the microkernel hypervisor to use comprises at most a subset of the collection of direct-mapped physical memory pages for guest VM execution.

3. The method of claim 1, wherein the identified set of page tables for guest VM memory accessible by the identified hypervisor application and the microkernel hypervisor to use present only a minimum amount of guest VM memory to support execution of the hypervisor application in performing its functions in servicing the request for hypervisor processing.

4. The method of claim 1, wherein each request for hypervisor processing by any of the plurality of guest VMs is serviced by a selected hypervisor application of one or more hypervisor applications of the plurality of hypervisor applications.

5. The method of claim 4, wherein the request for processing comprises a trap to hypervisor processing which immediately invokes processing of the microkernel hypervisor for a determination of which hypervisor application is to service the request for hypervisor processing, wherein the method further comprises:
executing the microkernel hypervisor and determining, by the microkernel hypervisor, whether the request for hypervisor processing comprises a request by the guest VM for a paravirtualization interface or a request by the guest VM for emulation of a guest instruction;
selecting, as the identified hypervisor application to service the request for hypervisor processing, between a first hypervisor application of the one or more hypervisor applications and a second hypervisor application of the one or more hypervisor applications, the first hypervisor application being dedicated to servicing paravirtualization interface requests, and the second hypervisor application being dedicated to servicing guest VM instruction emulation requests, wherein the identifying the set of page tables and the presenting the identified set of page tables for guest VM memory access identifies and presents the set of page tables corresponding to the guest VM and the selected first or second hypervisor application for execution of the selected first or second hypervisor application, which limits the amount of the guest VM memory that is accessible by that first or second hypervisor application and the microkernel hypervisor to at most a first subset of the guest VM memory;

executing the selected first or second hypervisor application to begin servicing the request for hypervisor processing, wherein the executing the selected first or second hypervisor application comprises invoking, by the executing selected first or second hypervisor application, execution of another hypervisor application, of the plurality of hypervisor applications, for further hypervisor processing to service the request for hypervisor processing, wherein the invoking is performed by a call to the microkernel hypervisor by the selected first or second hypervisor application;

based on invoking execution of the another hypervisor application, identifying another set of page tables of the plurality of page tables, which corresponds to the guest VM and the another hypervisor application, and switching the page table base address in hardware to be the page table address for the another identified set of page tables, to thereby present the another set of page tables for the another hypervisor application and the microkernel hypervisor to use in accessing guest VM memory during execution of the another hypervisor application, wherein presenting the another set of page tables limits the amount of guest VM memory that is accessible by the another hypervisor application and the microkernel hypervisor to at most a second subset of the guest VM memory, the second subset being a different portion of guest VM memory than the first subset; and based on completing execution of the another hypervisor application to complete handling of the request for hypervisor processing, either (i) initiating a return of context to the selected first or second hypervisor application, which includes switching the page table base address in hardware to the page table address for the identified set of page tables for the selected first or second hypervisor application, or (ii) initiating a world switch back to the guest VM, which includes switching the page table base address in hardware to a page table address for a set of page tables for execution of the guest VM.

6. The method of claim 4, wherein the request for processing comprises a trap to hypervisor processing which invokes execution of the identified hypervisor application to begin servicing the request for hypervisor processing and indicates the page table address of the identified set of page tables as the page table base address in hardware for the hypervisor application and the microkernel hypervisor to use in accessing guest VM memory, thereby limiting the amount of guest VM memory that is accessible by the identified hypervisor application and the microkernel hypervisor to at most the subset of the guest VM memory, wherein the subset is a first subset of the guest VM memory, and wherein the method further comprises:

the identified hypervisor application, as part of its execution, invoking execution of another hypervisor application, of the plurality of hypervisor applications, for further hypervisor processing to service the request for hypervisor processing, wherein the invoking is performed by a call to the microkernel hypervisor by the identified hypervisor application;

based on invoking execution of the another hypervisor application, identifying another set of page tables of the plurality of page tables, which corresponds to the guest VM and the another hypervisor application, and switching the page table base address in hardware to the page table address for the another identified set of page tables, to thereby present the another set of page tables for the another hypervisor application and the microkernel hypervisor to use in accessing guest VM memory during execution of the another hypervisor application, wherein presenting the another set of page tables limits the amount of guest VM memory that is accessible by the another hypervisor application and the microkernel hypervisor to at most a second subset of the guest VM memory, the second subset being a different portion of guest VM memory than the first subset; and based on completing execution of the another hypervisor application to complete handling of the request for hypervisor processing, either (i) initiating a return of context to the hypervisor application, which includes switching the page table base address in hardware to the page table address for the identified set of page tables for the identified hypervisor application, or (ii) initiating a world switch back to the guest VM, which includes switching the page table base address in hardware to be a page table address for a set of page tables for execution of the guest VM.

7. The method of claim 4, wherein one hypervisor application of the plurality of hypervisor applications is invoked for execution only in response to invocation by a different hypervisor application of the plurality of hypervisor applications.

8. The method of claim 1, wherein the page table base address is provided in hardware in a page table address register, and wherein the indicating the page table address of the identified set of page tables comprises storing the page table address of the identified set of page tables in the page table address register.

9. A computer system comprising:
a memory; and
a processor in communication with the memory, wherein the computer system is configured to perform a method comprising:
maintaining a plurality of sets of page tables for a computer system executing a microkernel hypervisor with host privileges, the microkernel hypervisor hosting a plurality of guest virtual machines (VMs) executing with guest privileges, each guest VM of the plurality of guest VMs having guest VM memory corresponding to a dedicated portion of computer system physical memory for guest VM execution, wherein the plurality of sets of page tables comprise, for each guest VM of the plurality of guest VMs and each hypervisor application of a plurality of hypervisor applications, a respective set of page tables corresponding to the combination of that guest VM and that hypervisor application, wherein, for any guest VM of the plurality of guest VMs and any hypervisor application of the plurality of hypervisor applications, there is a corresponding set of page tables of the plurality of sets of page tables that maps guest virtual memory to computer system physical memory and the corresponding set of page tables includes mappings to at most a subset of the guest VM memory to thereby limit an amount of the guest VM memory that is accessible when the corresponding set of page tables is presented for executing software; and controlling presentation of the plurality of sets of page tables for hypervisor processing, wherein the controlling presentation selectively presents just one of the sets of page tables at any given time during hypervisor application execution to provide access to guest VM memory, wherein access to guest VM memory and the corresponding portion of the computer system physical memory is controlled by controlling a page table base address presented in hardware of the computer system, and wherein the controlling presentation comprises, based on a request for hypervisor processing for a guest VM of the plurality of guest VMs:

identifying a hypervisor application of the plurality of hypervisor applications to service the request for hypervisor processing;

identifying the set of page tables, of the plurality of sets of page tables, that corresponds to the combination of the identified hypervisor application and the guest VM for which the hypervisor processing was requested; and presenting the identified set of page tables for guest VM memory access by the identified hypervisor application and the microkernel hypervisor by indicating a page table address of the identified set of page tables as the page table base address in hardware for the hypervisor application and the microkernel hypervisor to use in accessing guest VM memory, wherein presenting the identified set of page tables limits the amount of guest VM memory, of that guest VM, that is accessible by that hypervisor application and the microkernel hypervisor to at most the subset of the guest VM memory.

10. The computer system of claim 9, wherein the guest VM memory comprises a collection of direct-mapped physical memory pages for guest VM execution, and wherein the subset of the guest VM memory made accessible by the hypervisor application and the microkernel hypervisor to use comprises at most a subset of the collection of direct-mapped physical memory pages for guest VM execution.

11. The computer system of claim 9, wherein the identified set of page tables for guest VM memory accessible by the identified hypervisor application and the microkernel hypervisor to use present only a minimum amount of guest VM memory to support execution of the hypervisor application in performing its functions in servicing the request for hypervisor processing.

12. The computer system of claim 9, wherein each request for hypervisor processing by any of the plurality of guest VMs is serviced by a selected hypervisor application of one or more hypervisor applications of the plurality of hypervisor applications.

13. The computer system of claim 12, wherein the request for processing comprises a trap to hypervisor processing which immediately invokes processing of the microkernel hypervisor for a determination of which hypervisor application is to service the request for hypervisor processing, wherein the method further comprises:

executing the microkernel hypervisor and determining, by the microkernel hypervisor, whether the request for hypervisor processing comprises a request by the guest VM for a paravirtualization interface or a request by the guest VM for emulation of a guest instruction;

selecting, as the identified hypervisor application to service the request for hypervisor processing, between a first hypervisor application of the one or more hypervisor applications and a second hypervisor application of the one or more hypervisor applications, the first hypervisor application being dedicated to servicing paravirtualization interface requests, and the second hypervisor application being dedicated to servicing guest VM instruction emulation requests, wherein the identifying the set of page tables and the presenting the identified set of page tables for guest VM memory access identifies and presents the set of page tables corresponding to the guest VM and the selected first or second hypervisor application for execution of the selected first or second hypervisor application, which limits the amount of the guest VM memory that is accessible by that first or second hypervisor application and the microkernel hypervisor to at most a first subset of the guest VM memory;

executing the selected first or second hypervisor application to begin servicing the request for hypervisor processing, wherein the executing the selected first or second hypervisor application comprises invoking, by the executing selected first or second hypervisor application, execution of another hypervisor application, of the plurality of hypervisor applications, for further hypervisor processing to service the request for hypervisor processing, wherein the invoking is performed by a call to the microkernel hypervisor by the selected first or second hypervisor application;

based on invoking execution of the another hypervisor application, identifying another set of page tables of the plurality of page tables, which corresponds to the guest VM and the another hypervisor application, and switching the page table base address in hardware to be the page table address for the another identified set of page tables, to thereby present the another set of page tables for the another hypervisor application and the microkernel hypervisor to use in accessing guest VM memory during execution of the another hypervisor application, wherein presenting the another set of page tables limits the amount of guest VM memory that is accessible by the another hypervisor application and the microkernel hypervisor to at most a second subset of the guest VM memory, the second subset being a different portion of guest VM memory than the first subset; and based on completing execution of the another hypervisor application to complete handling of the request for hypervisor processing, either (i) initiating a return of context to the selected first or second hypervisor application, which includes switching the page table base address in hardware to the page table address for the identified set of page tables for the selected first or second hypervisor application, or (ii) initiating a world switch back to the guest VM, which includes switching the page table base address in hardware to a page table address for a set of page tables for execution of the guest VM.

14. The computer system of claim 12, wherein the request for processing comprises a trap to hypervisor processing which invokes execution of the identified hypervisor application to begin servicing the request for hypervisor processing and indicates the page table address of the identified set of page tables as the page table base address in hardware for the hypervisor application and the microkernel hypervisor to use in accessing guest VM memory, thereby limiting the amount of guest VM memory that is accessible by the identified hypervisor application and the microkernel hypervisor to at most the subset of the guest VM memory, wherein the subset is a first subset of the guest VM memory, and wherein the method further comprises:
 the identified hypervisor application, as part of its execution, invoking execution of another hypervisor application, of the plurality of hypervisor applications, for further hypervisor processing to service the request for hypervisor processing, wherein the invoking is performed by a call to the microkernel hypervisor by the identified hypervisor application;
 based on invoking execution of the another hypervisor application, identifying another set of page tables of the plurality of page tables, which corresponds to the guest VM and the another hypervisor application, and switching the page table base address in hardware to the page table address for the another identified set of page tables, to thereby present the another set of page tables for the another hypervisor application and the microkernel hypervisor to use in accessing guest VM memory during execution of the another hypervisor application, wherein presenting the another set of page tables limits the amount of guest VM memory that is accessible by the another hypervisor application and the microkernel hypervisor to at most a second subset of the guest VM memory, the second subset being a different portion of guest VM memory than the first subset; and
 based on completing execution of the another hypervisor application to complete handling of the request for hypervisor processing, either (i) initiating a return of context to the hypervisor application, which includes switching the page table base address in hardware to the page table address for the identified set of page tables for the identified hypervisor application, or (ii) initiating a world switch back to the guest VM, which includes switching the page table base address in hardware to be a page table address for a set of page tables for execution of the guest VM.

15. The computer system of claim 12, wherein one hypervisor application of the plurality of hypervisor applications is invoked for execution only in response to invocation by a different hypervisor application of the plurality of hypervisor applications.

16. The computer system of claim 9, wherein the page table base address is provided in hardware in a page table address register, and wherein the indicating the page table address of the identified set of page tables comprises storing the page table address of the identified set of page tables in the page table address register.

17. A computer program product comprising:
 a non-transitory computer readable storage medium storing instructions for execution to perform a method comprising:
  maintaining a plurality of sets of page tables for a computer system executing a microkernel hypervisor with host privileges, the microkernel hypervisor hosting a plurality of guest virtual machines (VMs) executing with guest privileges, each guest VM of the plurality of guest VMs having guest VM memory corresponding to a dedicated portion of computer system physical memory for guest VM execution, wherein the plurality of sets of page tables comprise, for each guest VM of the plurality of guest VMs and each hypervisor application of a plurality of hypervisor applications, a respective set of page tables corresponding to the combination of that guest VM and that hypervisor application, wherein, for any guest VM of the plurality of guest VMs and any hypervisor application of the plurality of hypervisor applications, there is a corresponding set of page tables of the plurality of sets of page tables that maps guest virtual memory to computer system physical memory and the corresponding set of page tables includes mappings to at most a subset of the guest VM memory to thereby limit an amount of the guest VM memory that is accessible when the corresponding set of page tables is presented for executing software; and
  controlling presentation of the plurality of sets of page tables for hypervisor processing, wherein the controlling presentation selectively presents just one of the sets of page tables at any given time during hypervisor application execution to provide access to guest VM memory, wherein access to guest VM memory and the corresponding portion of the computer system physical memory is controlled by controlling a page table base address presented in hardware of the computer system, and wherein the controlling presentation comprises, based on a request for hypervisor processing for a guest VM of the plurality of guest VMs:
   identifying a hypervisor application of the plurality of hypervisor applications to service the request for hypervisor processing;
   identifying the set of page tables, of the plurality of sets of page tables, that corresponds to the combination of the identified hypervisor application and the guest VM for which the hypervisor processing was requested; and
   presenting the identified set of page tables for guest VM memory access by the identified hypervisor application and the microkernel hypervisor by indicating a page table address of the identified set of page tables as the page table base address in hardware for the hypervisor application and the microkernel hypervisor to use in accessing guest VM memory, wherein presenting the identified set of page tables limits the amount of guest VM memory, of that guest VM, that is accessible by that hypervisor application and the microkernel hypervisor to at most the subset of the guest VM memory.

18. The computer program product of claim 17, wherein the guest VM memory comprises a collection of direct-mapped physical memory pages for guest VM execution, and wherein the subset of the guest VM memory made accessible by the hypervisor application and the microkernel hypervisor to use comprises at most a subset of the collection of direct-mapped physical memory pages for guest VM execution.

19. The computer program product of claim 17, wherein the identified set of page tables for guest VM memory accessible by the identified hypervisor application and the microkernel hypervisor to use present only a minimum amount of guest VM memory to support execution of the hypervisor application in performing its functions in servicing the request for hypervisor processing.

20. The computer program product of claim 17, wherein each request for hypervisor processing by any of the plurality of guest VMs is serviced by a selected hypervisor application of one or more hypervisor applications of the plurality of hypervisor applications.

21. The computer program product of claim 20, wherein the request for processing comprises a trap to hypervisor processing which immediately invokes processing of the microkernel hypervisor for a determination of which hypervisor application is to service the request for hypervisor processing, wherein the method further comprises:
- executing the microkernel hypervisor and determining, by the microkernel hypervisor, whether the request for hypervisor processing comprises a request by the guest VM for a paravirtualization interface or a request by the guest VM for emulation of a guest instruction;
- selecting, as the identified hypervisor application to service the request for hypervisor processing, between a first hypervisor application of the one or more hypervisor applications and a second hypervisor application of the one or more hypervisor applications, the first hypervisor application being dedicated to servicing paravirtualization interface requests, and the second hypervisor application being dedicated to servicing guest VM instruction emulation requests, wherein the identifying the set of page tables and the presenting the identified set of page tables for guest VM memory access identifies and presents the set of page tables corresponding to the guest VM and the selected first or second hypervisor application for execution of the selected first or second hypervisor application, which limits the amount of the guest VM memory that is accessible by that first or second hypervisor application and the microkernel hypervisor to at most a first subset of the guest VM memory;
- executing the selected first or second hypervisor application to begin servicing the request for hypervisor processing, wherein the executing the selected first or second hypervisor application comprises invoking, by the executing selected first or second hypervisor application, execution of another hypervisor application, of the plurality of hypervisor applications, for further hypervisor processing to service the request for hypervisor processing, wherein the invoking is performed by a call to the microkernel hypervisor by the selected first or second hypervisor application;
- based on invoking execution of the another hypervisor application, identifying another set of page tables of the plurality of page tables, which corresponds to the guest VM and the another hypervisor application, and switching the page table base address in hardware to be the page table address for the another identified set of page tables, to thereby present the another set of page tables for the another hypervisor application and the microkernel hypervisor to use in accessing guest VM memory during execution of the another hypervisor application, wherein presenting the another set of page tables limits the amount of guest VM memory that is accessible by the another hypervisor application and the microkernel hypervisor to at most a second subset of the guest VM memory, the second subset being a different portion of guest VM memory than the first subset; and
- based on completing execution of the another hypervisor application to complete handling of the request for hypervisor processing, either (i) initiating a return of context to the selected first or second hypervisor application, which includes switching the page table base address in hardware to the page table address for the identified set of page tables for the selected first or second hypervisor application, or (ii) initiating a world switch back to the guest VM, which includes switching the page table base address in hardware to a page table address for a set of page tables for execution of the guest VM.

22. The computer program product of claim 20, wherein the request for processing comprises a trap to hypervisor processing which invokes execution of the identified hypervisor application to begin servicing the request for hypervisor processing and indicates the page table address of the identified set of page tables as the page table base address in hardware for the hypervisor application and the microkernel hypervisor to use in accessing guest VM memory, thereby limiting the amount of guest VM memory that is accessible by the identified hypervisor application and the microkernel hypervisor to at most the subset of the guest VM memory, wherein the subset is a first subset of the guest VM memory, and wherein the method further comprises:
- the identified hypervisor application, as part of its execution, invoking execution of another hypervisor application, of the plurality of hypervisor applications, for further hypervisor processing to service the request for hypervisor processing, wherein the invoking is performed by a call to the microkernel hypervisor by the identified hypervisor application;
- based on invoking execution of the another hypervisor application, identifying another set of page tables of the plurality of page tables, which corresponds to the guest VM and the another hypervisor application, and switching the page table base address in hardware to the page table address for the another identified set of page tables, to thereby present the another set of page tables for the another hypervisor application and the microkernel hypervisor to use in accessing guest VM memory during execution of the another hypervisor application, wherein presenting the another set of page tables limits the amount of guest VM memory that is accessible by the another hypervisor application and the microkernel hypervisor to at most a second subset of the guest VM memory, the second subset being a different portion of guest VM memory than the first subset; and
- based on completing execution of the another hypervisor application to complete handling of the request for hypervisor processing, either (i) initiating a return of context to the hypervisor application, which includes switching the page table base address in hardware to the page table address for the identified set of page tables for the identified hypervisor application, or (ii) initiating a world switch back to the guest VM, which includes switching the page table base address in hardware to be a page table address for a set of page tables for execution of the guest VM.

23. The computer program product of claim 20, wherein one hypervisor application of the plurality of hypervisor applications is invoked for execution only in response to invocation by a different hypervisor application of the plurality of hypervisor applications.

24. The computer program product of claim 17, wherein the page table base address is provided in hardware in a page table address register, and wherein the indicating the page table address of the identified set of page tables comprises storing the page table address of the identified set of page tables in the page table address register.

\* \* \* \* \*